(12) United States Patent
Hofmann et al.

(10) Patent No.: US 11,168,776 B2
(45) Date of Patent: Nov. 9, 2021

(54) SYSTEMS AND METHODS FOR IMPLEMENTING TAILORED METALLIC GLASS-BASED STRAIN WAVE GEARS AND STRAIN WAVE GEAR COMPONENTS

(71) Applicant: California Institute of Technology, Pasadena, CA (US)

(72) Inventors: Douglas C. Hofmann, Altadena, CA (US); Brian H. Wilcox, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 16/908,489

(22) Filed: Jun. 22, 2020

(65) Prior Publication Data
US 2020/0318721 A1 Oct. 8, 2020

Related U.S. Application Data

(60) Continuation of application No. 16/214,848, filed on Dec. 10, 2018, now Pat. No. 10,690,227, which is a
(Continued)

(51) Int. Cl.
*F16H 49/00* (2006.01)
*C22C 45/10* (2006.01)
*B22D 19/00* (2006.01)

(52) U.S. Cl.
CPC ....... *F16H 49/001* (2013.01); *B22D 19/0036* (2013.01); *C22C 45/10* (2013.01);
(Continued)

(58) Field of Classification Search
CPC ............... F16H 49/00; F16H 455/0833; Y10T 29/49462; Y10T 29/49467; Y10T 29/49478; Y10T 29/4948
See application file for complete search history.

(56) References Cited

U.S. PATENT DOCUMENTS

| 3,519,444 A | 7/1970 | Brown et al. |
| 4,584,036 A | 4/1986 | Taub et al. |
| (Continued) | | |

FOREIGN PATENT DOCUMENTS

| CN | 203227820 U | 10/2013 |
| EP | 3630395 A1 | 4/2020 |
| (Continued) | | |

OTHER PUBLICATIONS

International Preliminary Report on Patentability for International Application PCT/US2018/035813, Report issued Dec. 3, 2019, dated Dec. 12, 2019, 9 Pgs.
(Continued)

*Primary Examiner* — Jason L Vaughan
(74) *Attorney, Agent, or Firm* — KPPB LLP

(57) ABSTRACT

Systems and methods in accordance with embodiments of the invention implement tailored metallic glass-based strain wave gears and strain wave gear components. In one embodiment, a method of fabricating a flexspline of a strain wave gear includes: forming a MG-based composition into a flexspline using one of a thermoplastic forming technique and a casting technique; where the forming of the MG-based composition results in a formed MG-based material; where the formed flexspline is characterized by: a minimum thickness of greater than approximately 1 mm and a major diameter of less than approximately 4 inches.

20 Claims, 28 Drawing Sheets

Related U.S. Application Data division of application No. 15/062,902, filed on Mar. 7, 2016, now Pat. No. 10,151,377.

(60) Provisional application No. 62/128,827, filed on Mar. 5, 2015.

(52) U.S. Cl.
CPC ..... *F16H 2049/003* (2013.01); *Y10T 29/4948* (2015.01); *Y10T 29/49462* (2015.01)

(56) References Cited

U.S. PATENT DOCUMENTS

| | | | |
|---|---|---|---|
| 4,670,636 | A | 6/1987 | Taub et al. |
| 4,783,983 | A | 11/1988 | Narasimhan |
| 5,005,456 | A | 4/1991 | Ballard et al. |
| 5,185,198 | A | 2/1993 | Lefeber et al. |
| 5,417,385 | A | 5/1995 | Arnold et al. |
| 6,732,606 | B1 | 5/2004 | Zhu et al. |
| 7,323,071 | B1 | 1/2008 | Branagan |
| 7,540,929 | B2 | 6/2009 | Demetriou et al. |
| 7,575,040 | B2 | 8/2009 | Johnson |
| 8,496,077 | B2 | 7/2013 | Nesnas et al. |
| 9,044,805 | B2 | 6/2015 | Prest et al. |
| 9,579,718 | B2 | 2/2017 | Hofmann |
| 9,689,231 | B2 | 6/2017 | Fripp et al. |
| 9,996,053 | B2 | 6/2018 | O'keeffe et al. |
| 10,471,652 | B2 | 11/2019 | Hofmann et al. |
| 10,690,227 | B2 | 6/2020 | Hofmann et al. |
| 10,883,528 | B2 | 1/2021 | Hofmann et al. |
| 10,941,847 | B2 | 3/2021 | Hofmann et al. |
| 10,953,688 | B2 | 3/2021 | Parness et al. |
| 10,968,527 | B2 | 4/2021 | Hofmann et al. |
| 2005/0084407 | A1 | 4/2005 | Myrick |
| 2007/0039689 | A1 | 2/2007 | Petersson et al. |
| 2007/0144621 | A1 | 6/2007 | Farmer et al. |
| 2007/0270942 | A1 | 11/2007 | Thomas |
| 2008/0099175 | A1 | 5/2008 | Chu et al. |
| 2008/0190521 | A1 | 8/2008 | Loffler et al. |
| 2008/0304975 | A1 | 12/2008 | Clark et al. |
| 2009/0078370 | A1 | 3/2009 | Sklyarevich et al. |
| 2009/0246398 | A1 | 10/2009 | Kurahashi et al. |
| 2009/0263582 | A1 | 10/2009 | Batchelder |
| 2012/0006085 | A1 | 1/2012 | Johnson et al. |
| 2012/0132631 | A1 | 5/2012 | Wescott et al. |
| 2013/0068527 | A1 | 3/2013 | Parness et al. |
| 2013/0277891 | A1 | 10/2013 | Teulet |
| 2014/0010968 | A1 | 1/2014 | Prest et al. |
| 2014/0020794 | A1 | 1/2014 | Hofmann et al. |
| 2014/0090752 | A1 | 4/2014 | Waniuk et al. |
| 2014/0141164 | A1 | 5/2014 | Hofmann |
| 2014/0163717 | A1 | 6/2014 | Das et al. |
| 2014/0203622 | A1 | 7/2014 | Yamamoto et al. |
| 2014/0227125 | A1 | 8/2014 | Hofmann |
| 2014/0334106 | A1 | 11/2014 | Prest et al. |
| 2014/0342179 | A1 | 11/2014 | Hofmann et al. |
| 2015/0044084 | A1 | 2/2015 | Hofmann et al. |
| 2015/0158067 | A1 | 6/2015 | Kumar et al. |
| 2015/0165693 | A1 | 6/2015 | Sagoo et al. |
| 2015/0183169 | A1 | 7/2015 | Ehsani |
| 2015/0209889 | A1 | 7/2015 | Peters et al. |
| 2015/0219572 | A1 | 8/2015 | Beuth, Jr. et al. |
| 2015/0284035 | A1 | 10/2015 | Reese |
| 2015/0299825 | A1 | 10/2015 | Poole et al. |
| 2015/0352794 | A1 | 12/2015 | Nguyen et al. |
| 2016/0175929 | A1 | 6/2016 | Colin et al. |
| 2016/0242877 | A1 | 8/2016 | Bernhard |
| 2016/0361765 | A1 | 12/2016 | Danger et al. |
| 2017/0144225 | A1 | 5/2017 | Hofmann |
| 2017/0211168 | A1 | 7/2017 | Liu et al. |
| 2018/0272432 | A1 | 9/2018 | Jonsson et al. |
| 2018/0345366 | A1 | 12/2018 | Hofmann |
| 2019/0022923 | A1 | 1/2019 | Hofmann et al. |
| 2019/0037721 | A1 | 1/2019 | Curran et al. |
| 2019/0170235 | A1 | 6/2019 | Hofmann et al. |
| 2019/0177826 | A1 | 6/2019 | Hofmann et al. |
| 2019/0195269 | A1 | 6/2019 | Hofmann et al. |
| 2019/0255635 | A1 | 8/2019 | Hänni et al. |
| 2019/0314903 | A1 | 10/2019 | Haenle et al. |
| 2020/0000595 | A1 | 1/2020 | Jones et al. |
| 2020/0278016 | A1 | 9/2020 | Hofmann et al. |
| 2020/0278017 | A1 | 9/2020 | Hofmann et al. |
| 2020/0406579 | A1 | 12/2020 | Hahnlen |

FOREIGN PATENT DOCUMENTS

| | | |
|---|---|---|
| JP | 60116775 A | 6/1985 |
| JP | 62227070 A | 10/1987 |
| JP | 2004315340 A | 11/2004 |
| JP | 2013544648 A | 12/2013 |
| JP | 2018149655 A | 9/2018 |
| KR | 1020190119154 A | 10/2019 |
| WO | 2005077560 A1 | 8/2005 |
| WO | 2006073428 A2 | 7/2006 |
| WO | 2008058896 A1 | 5/2008 |
| WO | 2009069716 A1 | 6/2009 |
| WO | 2018218247 A1 | 11/2018 |
| WO | 2018223117 A2 | 12/2018 |
| WO | 2018223117 A3 | 1/2019 |

OTHER PUBLICATIONS

International Preliminary Report on Patentability for International Application PCT/US2018/034481, Report issued Nov. 26, 2019, dated Dec. 5, 2019, 17 Pgs.

International Preliminary Report on Patentability for International Application PCT/US2018/034924, Report issued Nov. 26, 2019, dated Dec. 5, 2019, 13 Pgs.

International Search Report and Written Opinion for International Application No. PCT/US2018/034924, Search completed Sep. 18, 2018, dated Sep. 19, 2018, 15 Pgs.

International Search Report and Written Opinion for International Application No. PCT/US2018/035813, Search completed Dec. 12, 2018, dated Dec. 12, 2018, 11 Pgs.

Adharapurapu et al., "Fracture of Ti-Al3Ti metal-intermetallic laminate composites: Effects of lamination on resistance-curve behavior", Metallurgical and Materials Transactions A, Nov. 2005, vol. 36A, 3217-3236.

Berger, "A Survey of Additive Manufacturing Processes Applied on the Fabrication of Gears", 1st International Conference on Progress in Additive Manufacturing (Pro-AM 2014), May 26-28, 2014, pp. 315-320, doi: 10.3850/978-981-09-0446-3_010.

Byrne et al., "Bulk Metallic Glasses", Science, Jul. 25, 2008, vol. 321, pp. 502-503.

Demetriou et al., "Glassy Steel Optimized for Glass-Forming ability and toughness", Applied Physics Letters 95, 041907.

Gu et al., "Selective Laser Melting Additive Manufacturing of Ti-Based Nanocomposites: The Role of Nanopowder", Metallurgical and Materials Transactions A, Jan. 2014, vol. 45, pp. 464-476.

Kumar et al., "Embrittlement of Zr-based Bulk Metallic Glasses", Science Direct, Acta Materialia, Year 2009, vol. 57, pp. 3572-35832009, vol. 57, pp. 3572-3583, available online May 11, 2009, doi:10.1016/j.actamat.2009.04.16.

Lu et al., "Crystallization Prediction on Laser Three-Dimensional Printing of Zr-based Bulk Metallic Glass", Journal of Non-Crystalline Solids, Year 2017, vol. 461, pp. 12-17, available online Jan. 29, 2017.

Roberts, "Developing and Characterizing Bulk Metallic Glasses for Extreme Applications", XP055731434, Retrieved from the Internet (Dec. 16, 2013) URL:https://thesis.library.caltech.edu/8049/141/Scott_Roberts_thesis_2013_Complete_ Thesis. pdf [retrieved on Sep. 17, 2020].

Yokoyama et al., "Tough Hypoeutectic Zr-Based Bulk Metallic Glasses", Metallurgical and Materials Transactions, Year 2011, vol. 42A, pp. 1468-1475, DOI: 10.1007/s11661-011-0631-1.

Zheng et al., "Processing and Behavior of Fe-Based Metallic Glass Components via Laser-Engineered Net Shaping", Metallurgical and Materials Transactions A, 40A, 1235-1245, DOI: 10.1007/s11661-009-9828-y.

(56) References Cited

OTHER PUBLICATIONS

Cheung et al., "Thermal and mechanical properties of Cu—Zr—Al bulk metallic glasses", Journal of Alloys and Compounds, vol. 434-435, 2007, pp. 71-74, doi: 10.1016/j.jallcom.2006.08.109.
Davis, "Gear Materials, Properties, and Manufacture", ASM International, Sep. 2005, Chapters 1-3, pp. 1-76.
Jiang et al., "Microstructure evolution and mechanical properties of Cu46Zr47Al7 bulk metallic glass composite containing CuZr crystallizing phases", Materials Science and Engineering A, vol. 467, 2007, pp. 139-145, doi: 10.1016/j.mesa.2007.02.093.
Yokoyama et al., "Relations between the Thermal and Mechanical Properties of Cast Zr-TM-Al (TM: Cu, Ni, or Co) Bulk Glassy Alloys", Materials Transactions, vol. 48, No. 7, Jun. 25, 2007, pp. 1846-1849.

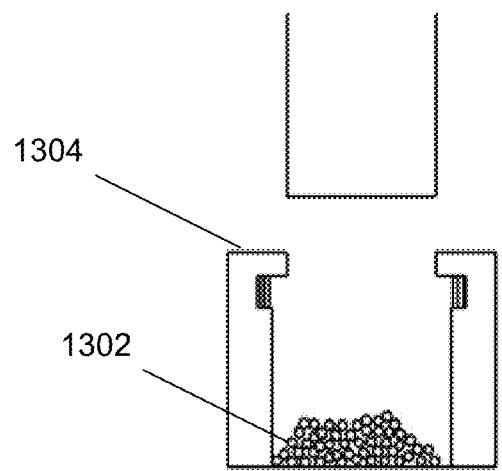
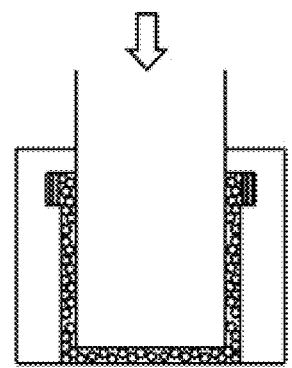
FIG. 13A  FIG. 13B
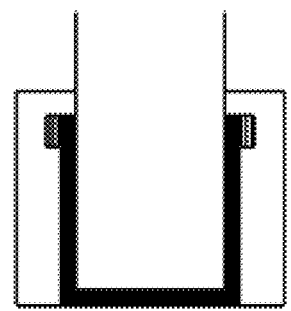
FIG. 13C

SYSTEMS AND METHODS FOR IMPLEMENTING TAILORED METALLIC GLASS-BASED STRAIN WAVE GEARS AND STRAIN WAVE GEAR COMPONENTS

CROSS-REFERENCE TO RELATED APPLICATIONS

The current application is a continuation of U.S. application Ser. No. 16/214,848, filed Dec. 10, 2018, which application is a divisional of U.S. application Ser. No. 15/062,902, filed Mar. 7, 2016, which claims priority to U.S. Provisional Application No. 62/128,827, filed Mar. 5, 2015, the disclosures of which are incorporated herein by reference in their entireties.

STATEMENT OF FEDERAL FUNDING

The invention described herein was made in the performance of work under a NASA contract NNN12AA01C, and is subject to the provisions of Public Law 96-517 (35 USC 202) in which the Contractor has elected to retain title.

FIELD OF THE INVENTION

The present invention generally relates to metallic glass-based strain wave gears and strain wave gear components.

BACKGROUND

Strain wave gears, also known as harmonic drives, are unique gearing systems that can provide high reduction ratios, high torque-to-weight and torque-to-volume ratios, near-zero backlash (which can mitigate the potential wearing of the components), and a host of other benefits. Typically, strain wave gears include an elliptical wave generator that is fitted within a flexspline such that the flexspline conforms to the elliptical shape of the wave generator; this arrangement also typically includes a set of ball bearings that allow the flexspline to rotate about the central axis of the elliptical shape relative to the wave generator. The flexspline is generally disposed within a ring-shaped circular spline, where the flexspline includes a set of gear teeth along its outer, elliptically shaped, perimeter that engage with gear teeth disposed along the inner circumference of the rim-shaped circular spline. Typically, the flexspline has fewer teeth than the circular spline. Notably, the flexspline is made of a flexible material such that when gear teeth of the flexspline and circular spline are engaged, the wave generator can rotate relative to the circular spline in a first direction, and thereby cause the deformation and associated rotation of the flexspline in a second opposite direction. Normally, an input torque is provided to the wave generator, and the flexspline generates a resulting output torque. Typically, the rate of rotation of the wave generator is much greater than the rate of rotation of the flexspline. Thus, strain wave gears can achieve high reduction ratios relative to gearing systems and can do so in a smaller form factor.

Note that in some alternative arrangements, the flexspline is held fixed, and the circular spline is used to provide an output torque.

As can be inferred, the operation of a strain wave gear is particularly nuanced and relies on a very precisely engineered gearing system. For example, the geometries of the constituent parts of strain wave gears must be fabricated with extreme accuracy in order to provide the desired operation. Moreover, the strain wave gear components must be fabricated from materials that can provide for the desired functionality. In particular, the flexspline must be flexible enough to withstand high-frequency periodic deformation, while at the same time being strong enough to accommodate the loads that the strain wave gear is anticipated to be subjected to.

Because of these constraints, heritage strain wave gears have largely been fabricated from steel, as steel has been demonstrated to possess the requisite materials properties, and steel can be machined into the desired geometries. However, the machining of steel into the constituent components can be fairly expensive. For example, in many instances, steel-based strain wave gears can cost on the order of $1,000 to $2,000 largely because of the expensive manufacturing processes.

In some instances, harmonic drives are fabricated from thermoplastic materials. Thermoplastic materials (e.g. polymers) can be cast (e.g. via injection molding processes) into the shapes of the constituent components, and thereby circumvent the expensive machining processes that are typically implemented in manufacturing steel-based strain wave gears. However, strain wave gears fabricated from thermoplastics may not be as strong as strain wave gears fabricated from steel.

SUMMARY OF THE INVENTION

Systems and methods in accordance with embodiments of the invention implement tailored metallic glass-based strain wave gears and strain wave gear components. In one embodiment, a method of fabricating a flexspline of a strain wave gear includes: forming a MG-based composition into a flexspline using one of a thermoplastic forming technique and a casting technique; where the forming of the MG-based composition results in a formed MG-based material; where the formed flexspline is characterized by: a minimum thickness of greater than approximately 1 mm and a major diameter of less than approximately 4 inches.

In another embodiment, the MG-based composition is formed into a flexspline using a casting technique.

In yet another embodiment, the MG-based composition is formed into a flexspline by casting it around a solid body.

In still another embodiment, the formed MG-based material has an entirely amorphous structure.

In still yet another embodiment, the formed MG-based material is a metallic glass matrix composite.

In a further embodiment, the formed MG-based material is further characterized by the inclusion of gear teeth.

In a yet further embodiment, the gear teeth are S-shaped.

In a still further embodiment, the MG-based composition is a Titanium-based MG-based composition.

In a still yet further embodiment, the method further includes selecting a MG-based composition for implementation based on desired flexspline performance.

In another embodiment, the selected MG-based composition includes constituent alloying elements, the presence of which causes the formed MG-based material to possess at least certain of the desired materials properties.

In yet another embodiment, the selected MG-based composition includes at least one of one of V, Nb, Ta, Mo, and Sn, when it is desired that the MG-based material to be formed be relatively more flexible.

In still another embodiment, the formation of the flexspline is a net shape process.

In still yet another embodiment, the formed flexspline is characterized by a maximum thickness of less than approximately 3 mm.

In a further embodiment, the MG-based composition is formed using a thermoplastic forming technique.

In a yet further embodiment, the thermoplastic forming technique is one of: a capacitive discharge forming technique; a frictional heating technique; and a blow molding technique.

In a still further embodiment, the forming of the MG-based composition includes: heating a first region of the MG-based composition to a temperature greater than the glass transition temperature of the MG-based composition; where at least some portion of the MG-based composition, that is continuous through the thickness of the MG-based composition, is not heated above its respective glass transition temperature when the first region is heated to a temperature greater than the glass transition temperature; and deforming the MG-based material within the first region while the temperature of the MG-based material within the first region is greater than its respective glass transition temperature.

In a still yet further embodiment, the formed MG-based material has an entirely amorphous structure.

In another embodiment, the formed MG-based material is a metallic glass matrix composite.

In yet another embodiment, the MG-based composition is a Titanium-based MG-based composition.

In still another embodiment, the forming of MG-based composition includes both a thermoplastic forming technique and a casting technique.

BRIEF DESCRIPTION OF THE DRAWINGS

FIGS. 13A-13C illustrate forming a strain wave gear component by thermoplastically forming MG-based material in the form of powder in accordance with certain embodiments of the invention.

DETAILED DESCRIPTION

Figure 1:
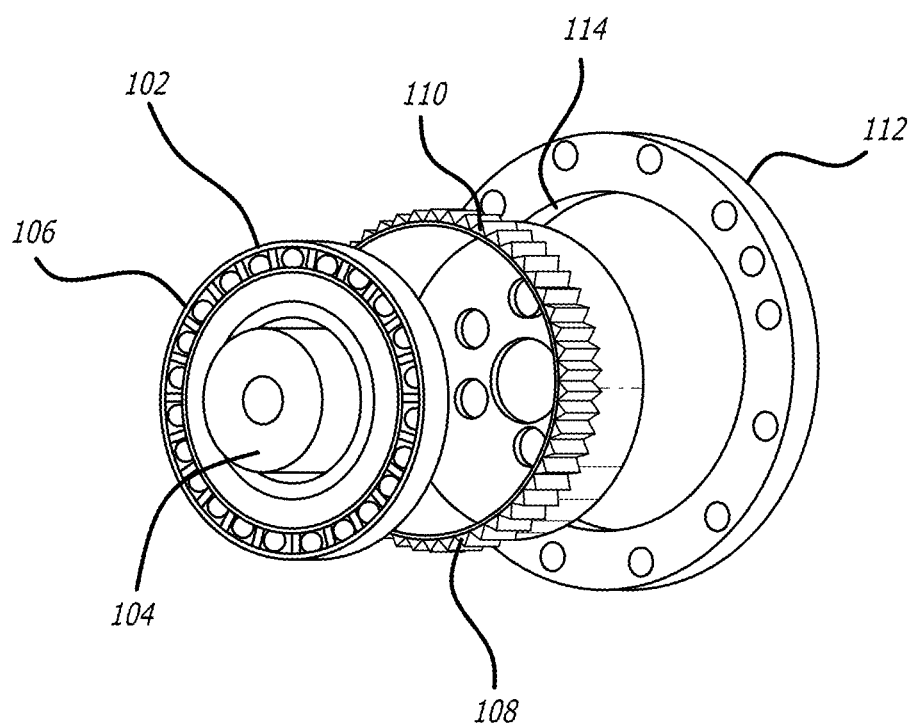
FIG. 1 illustrates a strain wave gear that can be fabricated from a MG-based material in accordance with certain embodiments of the invention.

Turning now to the drawings, systems and methods for implementing tailored metallic glass-based strain wave gears and strain wave gear components are illustrated.

Metallic glasses, also known as amorphous alloys (or alternatively amorphous metals), are characterized by their disordered atomic-scale structure in spite of their metallic constituent elements—i.e., whereas conventional metallic materials typically possess a highly ordered atomic structure, metallic glass materials are characterized by their disordered atomic structure. Notably, metallic glasses typically possess a number of useful material properties that can allow them to be implemented as highly effective engineering materials. For example, metallic glasses are generally much harder than conventional metals, and are generally tougher than ceramic materials. They are also relatively corrosion resistant, and, unlike conventional glass, they can have good electrical conductivity. Importantly, the manufacture of metallic glass materials lends itself to relatively easy processing. In particular, the manufacture of a metallic glass can be compatible with an injection molding process, or any similar casting process.

Nonetheless, the manufacture of metallic glasses presents challenges that limit their viability as engineering materials. In particular, metallic glasses are typically formed by raising a metallic alloy above its melting temperature, and rapidly cooling the melt to solidify it in a way such that its crystallization is avoided, thereby forming the metallic glass. The first metallic glasses required extraordinary cooling rates, e.g., on the order of $10^6$ K/s, and were thereby limited in the thickness with which they could be formed. Indeed, because of this limitation in thickness, metallic glasses were initially limited to applications that involved coatings. Since then, however, particular alloy compositions that are more resistant to crystallization have been developed, which can thereby form metallic glasses at much lower cooling rates, and can therefore be made to be much thicker (e.g., greater than 1 mm). These thicker metallic glasses are known as 'bulk metallic glasses' ("BMGs".)

In addition to the development of BMGs, 'bulk metallic glass matrix composites' (BMGMCs) have also been developed. BMGMCs are characterized in that they possess the amorphous structure of BMGs, but they also include crystalline phases of material within the matrix of the amorphous structure. For example the crystalline phases can exist in the form of dendrites. The crystalline phases can allow the material to have enhanced ductility, compared to where the material is entirely constituted of the amorphous structure. BMGs and BMGMCs can be referred to collectively as BMG-based materials. Similarly, metallic glasses, metallic glasses that include crystalline phase inclusions, BMGs, and BMGMCs can be referred to collectively as metallic glass-based materials or MG-based materials.

Even with these developments, the current state of the art has yet to fully appreciate the advantageous materials properties of MG-based materials. As a consequence, MG-based materials have seen limited use in engineering applications. For example, various publications have concluded, and it is largely established, that the viability of MG-based materials is mostly limited to microscale structures. (See e.g., G. Kumar et al., Adv. Mater. 2011, 23, 461-476, and M. Ashby et al., Scripta Materialia 54 (2006) 321-326, the disclosures of which are hereby incorporated by reference.) This is in part because the material properties, including the fracture mechanics, of MG-based materials are correlated with the specimen size. For example, it has been observed that the ductility of a MG material is inversely correlated with its thickness. (See e.g., Conner, Journal of Applied Physics, Volume 94, Number 2, Jul. 15, 2003, pgs. 904-911, the disclosure of which is hereby incorporated by reference.) Essentially, as component dimensions become greater, they become more and more prone to brittle failure. Thus, for these reasons and others, those skilled in the art have generally counseled that although MG-based materials may make for excellent materials for microscale structures, e.g. MEMS devices, they generally should not be used for macroscale components. (See e.g., G. Kumar et al., Adv. Mater. 2011, 23, 461-476.) Indeed, G. Kumar et al. have related brittle failure to the plastic zone size, and have generalized that a specimen thickness of approximately 10 times the plastic zone radius can exhibit 5% bending plasticity. (Id.) Thus, G. Kumar et al. conclude that a 1 mm thick specimen of Vitreloy can exhibit 5% bend plasticity. (Id.)

While the conventional understanding has suggested limited applications for MG-based materials, it has also touted the wear-resistant aspects of MG-based materials. (see e.g., Wu, Trans. Nonferrous Met. Soc. China 22 (2012), 585-589; Wu, Intermetallics 25 (2012) 115-125; Kong, Tribol Lett (2009) 35:151-158; Zenebe, Tribol Lett (2012) 47:131-138; Chen, J. Mater. Res., Vol. 26, No. 20, Oct. 28, 2011; Liu, Tribol Lett (2012) 46:131-138; the disclosures of which are hereby incorporated by reference.) To be clear, "wear" conventionally refers to the displacement of the surface of a material as a direct result of its mechanical interaction with another material. It is generally understood that a material's resistance to wear generally increases with its hardness, i.e. the harder a material is, the less susceptible it is to wear. (See e.g., I. L. Singer, Wear, Volume 195, Issues 1-2, July 1996, Pages 7-20.) Based on these understandings, it has been suggested that the predicted wear-resistance characteristics of MGs may make them excellent candidates for materials from which to fabricate miniature gears, given that gears are subject to extensive mechanical interaction and are thereby subject to wear. (See e.g., Chen, J. Mater. Res., Vol. 26, No. 20, Oct. 28, 2011; Huang, Intermetallics 19 (2011) 1385-1389; Liu, Tribol Lett (2009) 33:205-210; Zhang, Materials Science and Engineering A, 475 (2008) 124-127; Ishida, Materials Science and Engineering A, 449-451 (2007) 149-154; the disclosures of which are hereby incorporated by reference.) Thus, in accordance with the above-described insights, gears on a microscale have been fabricated (See e.g., Ishida, Materials Science and Engineering A, 449-451 (2007) 149-154, the disclosure of which is hereby incorporated by reference.)

However, contrary to the above-described conventional wisdom, Hofmann et al. have demonstrated that MG-based materials can be beneficially implemented in a variety of other applications. For example, U.S. patent application Ser. No. 13/928,109 to Hofmann et al. describes how MG-based materials can be developed for the fabrication of gears on a macroscale. In particular, U.S. patent application Ser. No. 13/928,109 explains that while Ishida demonstrated the fabrication of MG-based gears, the demonstration was limited inasmuch as the fabricated gears were of smaller dimensions (and thereby weren't subjected to the same modes of failure as macroscopic engineering component) and the gears operated using lubricant, which can mitigate tendencies for brittle fracture. (Id.) Generally, Hofmann et al. explain that the prior art has been principally concerned with harnessing the wear resistance properties of MG-based materials, and consequently focused on implementing the hardest MG-based materials. (Id.) This design methodology is limiting insofar as the hardest materials are more prone to other modes of failure. (Id.) Indeed, Hofmann et al. demonstrate that implementing the hardest MG-based materials in the fabrication of macroscale gears generally yields gears that fracture during operation. (Id.) Accordingly, Hofmann et al. disclose that MG-based materials can be developed to have favorable properties with respect to fracture toughness, and thereby can be made to fabricate macroscale gears that do not necessarily require lubricant to function. (Id.) The disclosure of U.S. patent application Ser. No. 13/928,109 is hereby incorporated by reference in its entirety, especially as it pertains to metallic glass-based materials, and their implementation in macroscale gears. Moreover, U.S. patent application Ser. No. 13/942,932 to Hofmann et al. discloses that MG-based materials possess other favorable materials properties that can also allow them to be used in the fabrication of macroscale compliant mechanisms. The disclosure of U.S. patent application Ser. No. 13/942,932 is hereby incorporated by reference in its entirety, especially as it pertains to metallic glass-based materials, and their implementation in macroscale compliant mechanisms.

The potential of metallic glass-based materials continues to be explored, and developments continue to emerge. For example, in U.S. patent application Ser. No. 14/060,478, D. Hofmann et al. disclose techniques for depositing layers of metallic glass-based materials to form objects. The disclosure of U.S. patent application Ser. No. 14/060,478 is hereby incorporated by reference especially as it pertains to metallic glass-based materials, and techniques for depositing them to form objects. Furthermore, in U.S. patent application Ser. No. 14/163,936, D. Hofmann et al., disclose techniques for additively manufacturing objects so that they include metallic glass-based materials. The disclosure of U.S. patent application Ser. No. 14/163,936 is hereby incorporated by reference in its entirety, especially as it pertains to metallic glass-based materials, and additive manufacturing techniques for manufacturing objects so that they include metallic glass-based materials. Additionally, in U.S. patent application Ser. No. 14/177,608, D. Hofmann et al. disclose techniques for fabricating strain wave gears using metallic glass-based materials. The disclosure of U.S. patent application Ser. No. 14/177,608 is hereby incorporated by reference in its entirety, especially as it pertains to metallic glass-based materials, and their implementation in strain wave gears. Moreover, in U.S. patent application Ser. No. 14/178,098, D. Hofmann et al., disclose selectively developing equilibrium inclusions within an object constituted from a metallic glass-based material. The disclosure of U.S. patent application Ser. No. 14/178,098 is hereby incorporated by reference, especially as it pertains to metallic glass-based materials, and the tailored development of equilibrium inclusions within them. Furthermore, in U.S. patent application Ser. No. 14/252,585, D. Hofmann et al. disclose techniques for shaping sheet materials that include metallic glass-based materials. The disclosure of U.S. patent application Ser. No. 14/252,585 is hereby incorporated by reference in its entirety, especially as it pertains to metallic glass-based materials and techniques for shaping sheet materials that include metallic glass-based materials. Additionally, in U.S. patent application Ser. No. 14/259,608, D. Hofmann et al. disclose techniques for fabricating structures including metallic glass-based materials using ultrasonic welding. The disclosure of U.S. patent application Ser. No. 14/259,608 is hereby incorporated by reference in its entirety, especially as it pertains to metallic glass-based materials and techniques for fabricating structures including metallic glass-based materials using ultrasonic welding. Moreover, in U.S. patent application Ser. No. 14/491,618, D. Hofmann et al. disclose techniques for fabricating structures including metallic glass-based materials using low pressure casting. The disclosure of U.S. patent application Ser. No. 14/491,618 is hereby incorporated by reference in its entirety, especially as it pertains to metallic glass-based materials and techniques for fabricating structures including metallic glass-based materials using low pressure casting. Furthermore, in U.S. patent application Ser. No. 14/660,730, Hofmann et al. disclose metallic glass-based fiber metal laminates. The disclosure of U.S. patent application Ser. No. 14/660,730 is hereby incorporated by reference in its entirety, especially as it pertains to metallic glass-based fiber metal laminates. Additionally, in U.S. patent application Ser. No. 14/971,848, Kennett et al. disclose fabricating gearbox housings from metallic glass-based materials. The disclosure of U.S. patent application Ser. No. 14/971,848 is hereby incorporated by reference in its entirety, especially as it pertains to fabricating gearbox housings from metallic glass-based materials and also as it pertains to casting metallic glass-based materials around a solid body to form useful objects.

Notwithstanding all of these developments, the vast potential of metallic glass-based materials has yet to be fully appreciated. The instant application discloses how MG-based materials can be implemented in the creation of highly customized and/or robust strain wave gears and strain wave gear components. Note that MG-based materials can be developed so that they have high fatigue resistance, high fracture toughness, excellent sliding friction properties, a low density, and a high elasticity. Moreover, these and other characteristics can be largely tunable, e.g. by alloying a given MG-based material or else applying some other processing (e.g. heat treating) to a MG-based material. This versatility can enable the implementation of highly customized and efficacious strain wave gears and/or strain wave gearing components; e.g. they can be made to sustain greater operating loads, be lighter, and/or have longer life cycles. Notably, the characteristics that MG-based materials can offer can give rise to unique design considerations that can enable the implementation of more robust configurations relative to those seen in conventional strain wave gears. The general operation of strain wave gears is now discussed in detail below.

Strain Wave Gear Operation

In many embodiments of the invention, strain wave gears and strain wave gear components are provided that incorporate MG-based materials and thereby have improved performance characteristics. To provide context, the basic operating principles of strain wave gears are now reviewed.

FIG. 1 illustrates an exploded view of a typical strain wave gear that can be fabricated from MG-based materials in accordance with embodiments of the invention. In particular, the strain wave gear 100 includes a wave generator 102, a flexspline 108, and a circular spline 112. The illustrated wave generator 102 includes a wave generator plug 104 and a ball bearing 106. Importantly, the wave generator plug 104 is elliptical in shape, and is disposed within the ball bearing 106 so that the ball bearing 106 to conforms to the elliptical shape. In this arrangement, the outer race of the ball bearing 106 can rotate relative to the wave generator plug 104. In the illustrated embodiment, the flexspline 108 is depicted as being in the shape of a cup; notably, the outer rim of the cup includes a set of gear teeth 110. In the illustration, the flexspline is fitted over the ball bearing, such that the outer rim of the flexspline conforms to the aforementioned elliptical shape. Note that in this arrangement, the ball bearing allows the flexspline to rotate relative to the wave generator plug. The circular spline, 112 is in the shape of a ring; importantly, the inner perimeter of the ring includes a set of gear teeth. Normally, there are more gear teeth on the circular spline 114 than on the flexspline 110. In many instances there are two more gear teeth on the circular spline 112 than on the flexspline 108. Typically, the flexspline 108 is fitted within the circular spline 112 such that the gear teeth of the flexspline 110 engage the gear teeth of the circular spline 114. Notably, because the gear teeth of the flexspline 110 conform to an elliptical shape, only the gear teeth proximate the major axis of the elliptical shape engage the gear teeth of the circular spline 114 in the usual case. Conversely, the gear teeth of the flex spline 110 that are proximate the minor axis of the elliptical shape are disengaged from the gear teeth of the circular spline 114. In many instances, 30% of the gear teeth of the flexspline 110 are engaged with the gear teeth of the circular spline 114. With this arrangement, the wave generator plug 104 can rotate in a first direction about the central axis of the elliptical shape, and thereby cause the flexspline 108 to rotate in a second opposite direction and at a different rate of rotation (generally slower) about the central axis of the elliptical shape. This can be achieved as the flexspline 108 is made of a flexible material that can accommodate the deflections that may result from the rotation of the wave generator plug 104.

Figure 2A:
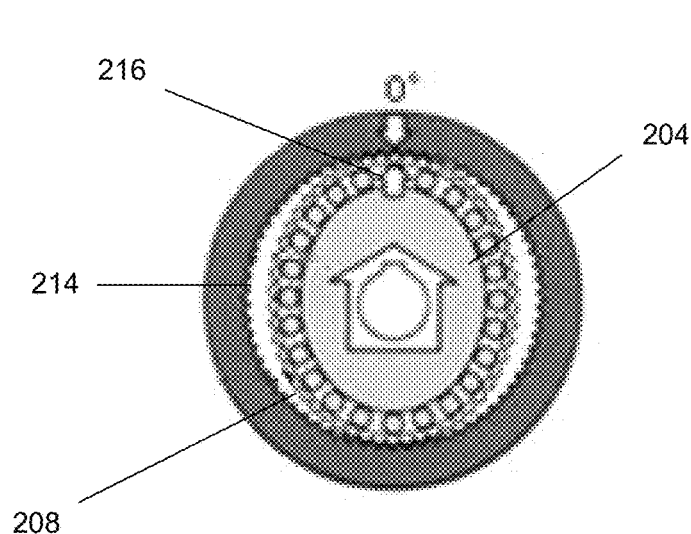
FIGS. 2A-2D illustrate the operation of a strain wave gear in accordance with certain embodiments of the invention.
Figure 2B:
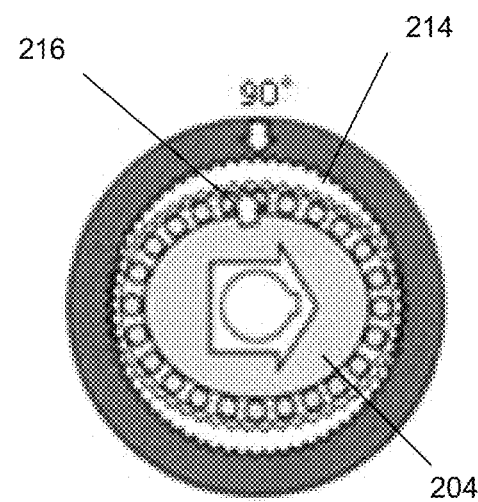
Figure 2C:
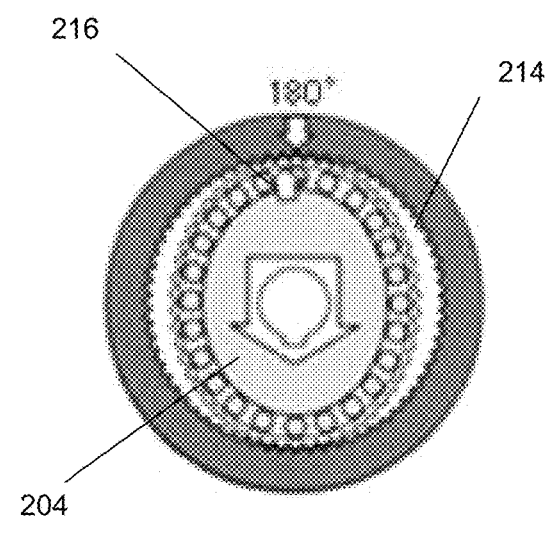
Figure 2D:
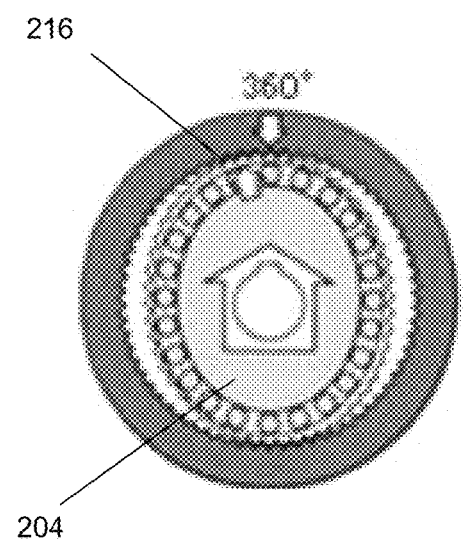

FIGS. 2A-2D depict the normal operation of a strain wave gear that can be fabricated from MG-based materials in accordance with embodiments of the invention. In particular, FIG. 2A illustrates a strain wave gear, where the wave generator plug 204 is in a first orientation such that the major axis of the elliptical shape is vertical relative to the drawing. This starting position is designated as '0° '. An arrow 216 designates one of the gear teeth of the flexspline 208 that is considered in FIGS. 2A-2D for purposes of illustration. FIG. 2B illustrates that the wave generator plug 204 has rotated clockwise 90°. The rotation of the wave generator plug 204 has caused the flexspline 208 to deflect in a particular fashion; as a result, the gear tooth corresponding with the arrow 216 is disengaged from the gear teeth of the circular spline 214. Notably, the gear tooth corresponding with the arrow 216, has rotated slightly counterclockwise in association with the 90° clockwise rotation of the wave generator plug 204. FIG. 2C illustrates that the wave generator plug 204 has rotated clockwise another 90° so that it has now rotated 180° clockwise relative to the initial starting position. In the illustration, gear tooth designated by the arrow 216 has reengaged the gear teeth of the circular spline 214 at a position slightly counterclockwise relative to the initial starting position. FIG. 2D illustrates that the wave generator plug 204 has rotated a full 360° clockwise relative to the initial starting position. Consequently, the gear tooth indicated by 216 has rotated slightly further counterclockwise than the position seen in FIG. 2C. In general, it is seen in FIGS. 2A-2D that a full 360° rotation of a wave generator plug 204 in one direction results in a slight rotation of the flexspline 208 in an opposite direction. In this way, strain wave gears can achieve relatively high reduction ratio within a small footprint. Typically an input torque is applied to the wave generator plug 204, while the flexspline 208 provides a corresponding output torque.

Of course, it should be understood that while an example of a strain wave gear design is illustrated and discussed above, any suitable strain wave gear design and any suitable strain wave gear components can be fabricated from MG-based materials in accordance with embodiments of the invention. For example, the flexspline can take any suitable shape, and is not required to be 'cup-shaped.' Similarly, any type of bearing can be implemented—not just a ball bearing. For example, needle roller bearings may be implemented. To be clear, the instant application is not meant to be limited to any particular strain wave gear design or strain wave gear component design. It is now discussed how MG-based materials can be implemented within strain wave gear components to enhance the performance of strain wave gears in accordance with embodiments of the invention.

Metallic Glass-Based Strain Wave Gears and Strain Wave Gear Components

Figure 3A:
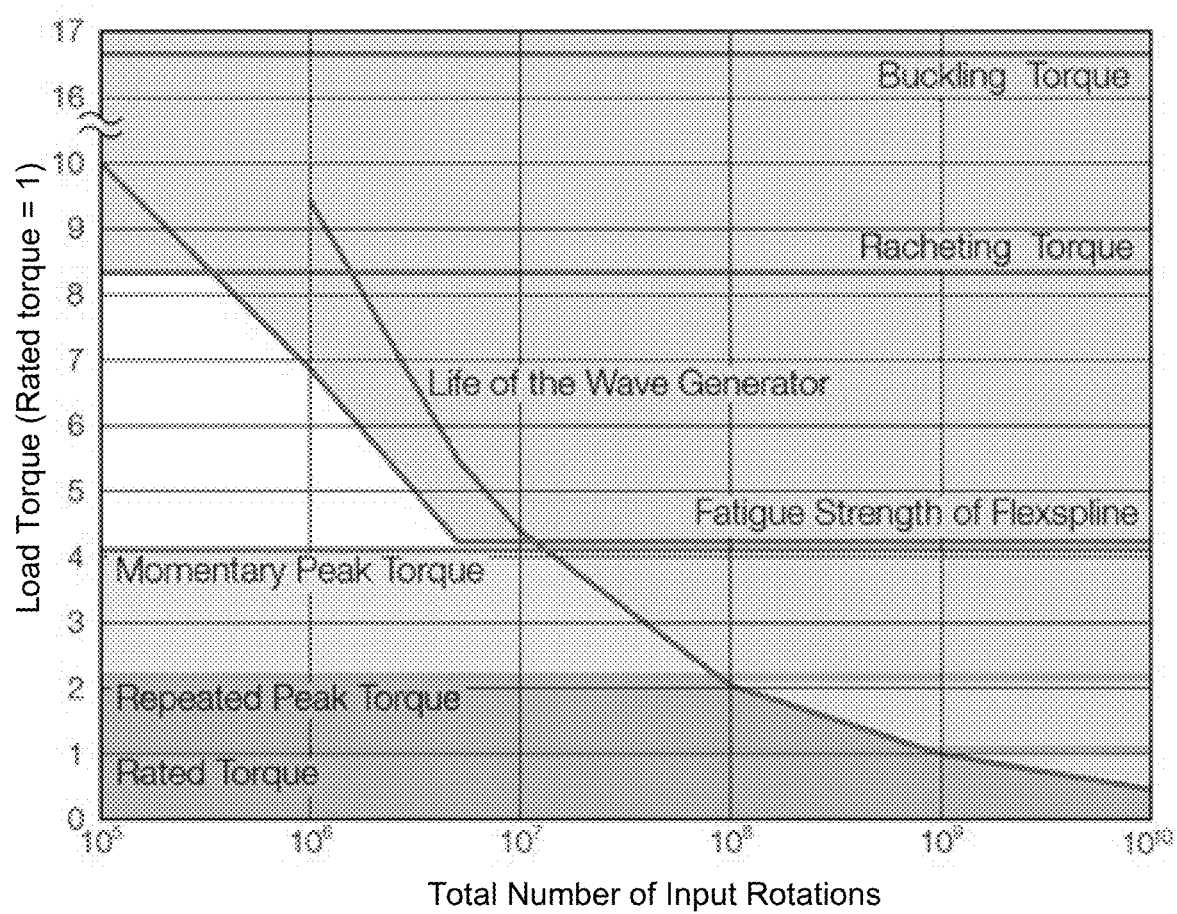
FIGS. 3A-3B illustrate the life expectancy of strain wave gears generally.
Figure 3B:
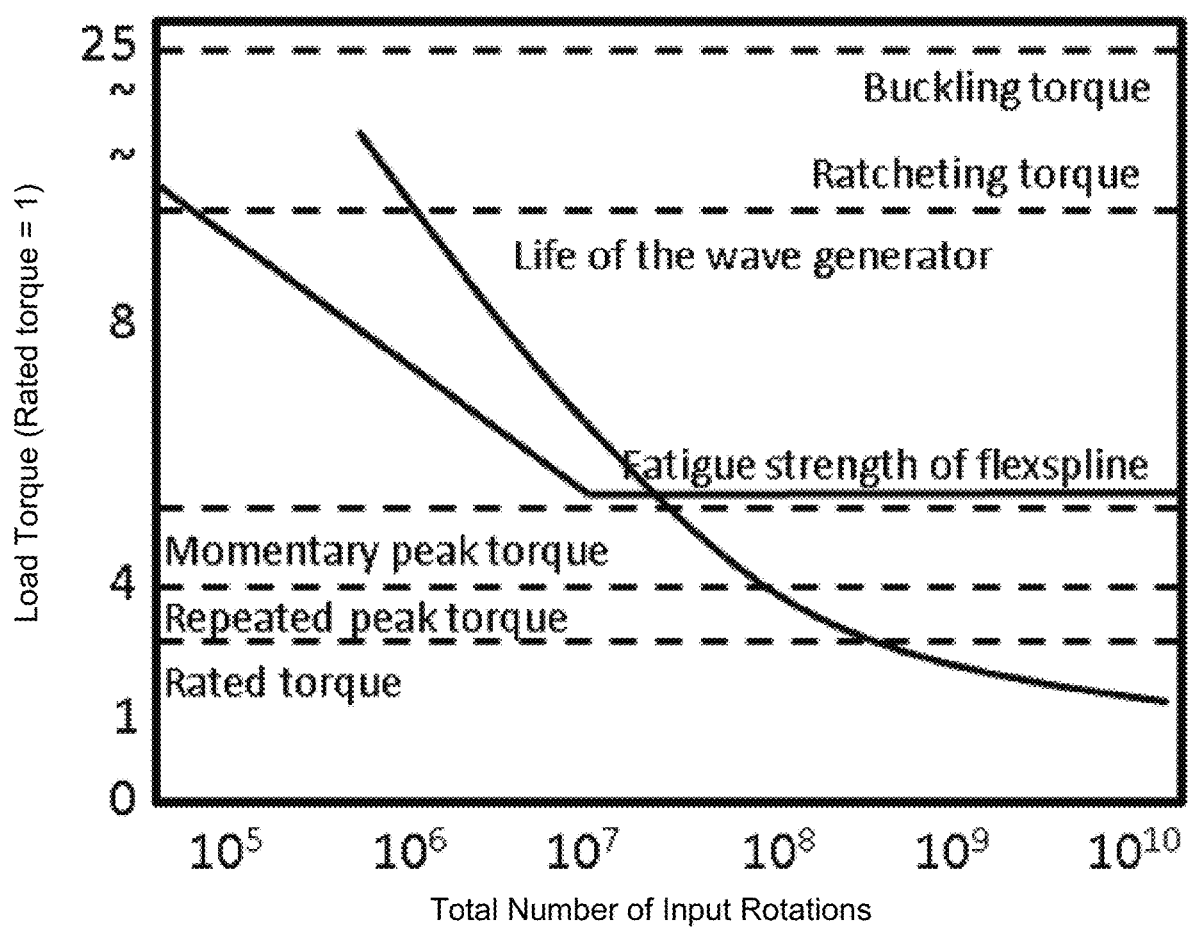

In many embodiments of the invention, MG-based materials are incorporated within strain wave gears and/or strain wave gear components. In many instances, MG-based materials can be developed to possess desired materials properties that can make them very-well suited for the fabrication of the constituent components of a strain wave gear. For example, from the above-described strain wave gear operating principles, it is evident that the ball bearing and the flexspline deflect in a periodic fashion with the rotation of the wave generator plug. As a result, it would be desirable that those components be fabricated from materials that have high fatigue strength. For example, FIGS. 3A and 3B depict how the fatigue strength of the flexspline is a principal determinant of the life of a strain wave gear. Notably, the flexspline in a strain wave gear typically fails when the flexspline fatigues (as opposed to other modes of failure), which causes it to permanently deform. In particular, FIG. 3A illustrates various representative torque specifications relative to rated torque for steel strain wave gears, and FIG. 3B illustrates the same information for MG-based strain wave gears. For FIGS. 3A-3B, the rated torque has been normalized to 1 and the strain wave gears are assumed to have similar geometric configurations for purposes of comparison.

Generally, the fatigue limit of a material is defined by the number of times that the material can be stressed at a particular level before the material permanently deforms. Assuming the same cyclic load is applied many times, the lower the load, the longer the materials will last before it deforms. The cyclic load at which a material can survive $10^7$ cycles is generally referred to as the fatigue limit of the material. If the material is cyclically loaded at its yield strength, it would presumably fail in one cycle. Thus, fatigue limits are generally reported as a percentage of their yield strength (to normalize their performance). As an illustration, a 300M steel has a fatigue limit which is 20% of its yield strength. If one assumes a fixed geometry of a part being fatigued, as with a flexspline, incorporating a more flexible material results in a lower stress per cycle, which can result in a much longer fatigue life.

Accordingly, MG-based materials can be favorably incorporated within a flexspline of a strain wave gear to provide enhanced fatigue performance. For example, MG-based materials can have an elastic limit as high as 2%, and can also have a stiffness about 3 times lower than steel-based materials. Typically, many MG-based materials can demonstrate elastic limits that are greater than approximately 1%, and it is these MG-based materials that can be particularly well-suited for implementation within strain wave gear components. Many MG-based materials can demonstrate elastic limits that are greater than approximately 1.5%. By contrast, 304 stainless steel has been reported to have an elastic limit of 0.1%. Generally, this implies that a flexspline fabricated from a MG-based material can experience lower stress per unit of deformation relative to a steel-based flexspline having an identical geometry (e.g. as measured by a respective material's yield strength). Correspondingly, the MG-based material can have much more favorable fatigue properties, e.g. a material that is subjected to less relative stress tends to be capable of withstanding more loading cycles. Importantly, whereas MG-based materials are often considered to be brittle and susceptible to fatigue failure by other measures, they can demonstrate great fatigue resistance when the applied stresses that they are subjected to are relatively less.

Note also that the differing stiffness values impact the geometries of the fabricated components. Thus, because MG-based materials can have relatively lower stiffness values (e.g. relative to steel), they can allow for strain wave gear components that have more favorable geometries. For example, a relatively lower stiffness can enable the implementation of a thicker flexspline, which can be advantageous. Indeed, the materials properties profile of MG-based materials generally can enable the development of more favorable geometries—i.e. in addition to stiffness, the other materials properties of MG-based materials can also contribute to the development of advantageous geometries.

Moreover, as is understood from the prior art, MG-based materials can have higher hardness values, and correspondingly demonstrate improved wear performance relative to heritage engineering materials. Materials with high hardness values can be particularly advantageous in strain wave gears, as the constituent components of strain wave gears are in continuous contact with one another and are subject to, for example, sliding friction. Generally, when gear teeth are subjected to a constant load and accompanying friction, the resulting associated elastic deformation and wear can precipitate 'ratcheting'. That MG-based materials can have a high hardness value, good resistance to wear (including a good resistance to galling), and high elasticity—even when subjected to high loads—can make them well-suited to be implemented within a strain wave gear. For example, the implementation of MG-based materials within the gear teeth of a strain wave gear can deter ratcheting. Furthermore, MG-based materials can be made to have a high hardness value throughout a broad temperature range. For example, MG-based materials can have a hardness value that does not vary as a function of temperature by more than 20% within the temperature range of 100K to 300K. Indeed, MG-based materials can have a strength that does not vary as a function of temperature by more than 20% within a temperature range of 100K to 300K. In general, the implementation of MG-based materials within strain wave gears can be favorable on many levels. Table 1 below illustrates how the materials properties of certain MG-based materials possess improved materials properties relative to heritage engineering materials in many respects.

TABLE 1

Material Properties of MG-Based Materials relative to Heritage Engineering Materials

| Material | Density (g/cc) | Stiffness, E (GPa) | Tensile Yield (MPa) | Tensile UTS (MPa) | Elastic Limit (%) | Specific Strength | Hardness (HRC) |
|---|---|---|---|---|---|---|---|
| SS 15500 H1024 | 7.8 | 200 | 1140 | 1170 | <1 | 146 | 36 |
| Ti—6Al—4V STA | 4.4 | 114 | 965 | 1035 | <1 | 219 | 41 |
| Ti—6Al—6V—4Sn STA | 4.5 | 112 | 1035 | 1100 | <1 | 230 | 42 |
| Nitronic 60 CW | 7.6 | 179 | 1241 | 1379 | <1 | 163 | 40 |
| Vascomax C300 | 8.0 | 190 | 1897 | 1966 | <1 | 237 | 50 |
| Zr-BMG | 6.1 | 97 | 1737 | 1737 | >1.8 | 285 | 60 |
| Ti-BMGMC | 5.2 | 94 | 1362 | 1429 | >1.4 | 262 | 51 |
| Zr-BMGMC | 5.8 | 75 | 1096 | 1210 | >1.4 | 189 | 48 |

Importantly, materials properties of MG-based materials are a function of the relative ratios of the constituent components and are also a function of the crystalline structure. As a result, the materials properties of a MG-based material can be tailored by varying the composition and varying the ratio of crystalline structure to amorphous structure. For example, in many embodiments it may be desirable to implement MG-based materials having a particular materials profile within a particular component of a strain wave gear. In these instances, an appropriate MG-based material may be developed and/or selected from which to fabricate a respective strain wave gear component. Tables 2, 3, and 4 depict how materials properties of MG-based materials can vary based on composition and crystalline structure.

TABLE 2

Material Properties of Select MG-Based Materials as a function of Composition

| name | atomic % | weight % | BMG (%) | bcc (%) | $\rho$ (g/cm$^2$) | $\sigma_y$ (g/cm$^3$) | $\sigma_{max}$ (MPa) | $\varepsilon_y$ (%) | E (GPa) | $T_s$ (K) |
|---|---|---|---|---|---|---|---|---|---|---|
| DV2 | $Ti_{44}Zr_{20}V_{12}Cu_5Be_{19}$ | $Ti_{41.9}Zr_{36.3}V_{12.1}Cu_{6.3}Be_{3.4}$ | 70 | 30 | 5.13 | 1597 | 1614 | 2.1 | 94.5 | 956 |
| DV1 | $Ti_{48}Zr_{20}V_{12}Cu_5Be_{15}$ | $Ti_{44.3}Zr_{35.2}V_{11.8}Cu_{6.1}Be_{2.6}$ | 53 | 47 | 5.15 | 1362 | 1429 | 2.3 | 94.2 | 955 |
| DV3 | $Ti_{56}Zr_{18}V_{10}Cu_4Be_{12}$ | $Ti_{51.6}Zr_{31.6}V_{9.8}Cu_{4.9}Be_{2.1}$ | 46 | 54 | 5.08 | 1308 | 1309 | 2.2 | 84.0 | 951 |
| DV4 | $Ti_{62}Zr_{15}V_{10}Cu_4Be_9$ | $Ti_{57.3}Zr_{26.4}V_{9.8}Cu_{4.9}Be_{1.6}$ | 40 | 60 | 5.03 | 1086 | 1089 | 2.1 | 83.7 | 940 |
| DVAl1 | $Ti_{60}Zr_{16}V_9Cu_3Al_3Be_9$ | $Ti_{55.8}Zr_{28.4}V_{8.9}Cu_{3.7}Al_{1.6}Be_{1.6}$ | 31 | 69 | 4.97 | 1166 | 1189 | 2.0 | 84.2 | 901 |
| DVAl2 | $Ti_{67}Zr_{11}V_{10}Cu_5Al_2Be_5$ | $Ti_{62.4}Zr_{19.5}V_{9.9}Cu_{6.2}Al_1Be_{0.9}$ | 20 | 80 | 4.97 | 990 | 1000 | 2.0 | 78.7 | 998 |
| Ti-6-4a | $Ti_{86.1}Al_{10.3}V_{3.6}$ | $Ti_{90}Al_6V_4$(Grade 5 Annealed) | na | na | 4.43 | 754 | 882 | 1.0 | 113.8 | 1877 |
| Ti-6-4s | $Ti_{86.1}Al_{10.3}V_{3.6}$[Ref] | $Ti_{90}Al_6V_4$(Grade 5 STA) | na | na | 4.43 | 1100 | 1170 | ~1 | 114.0 | 1877 |
| CP-Ti | $Ti_{100}$ | $Ti_{100}$ (Grade 2) | na | na | 4.51 | 380 | 409 | 0.7 | 105.0 | ~1930 |

TABLE 3

Material Properties of Select MG-Based Materials as a function of Composition

| Alloy | $\sigma_{max}$ (MPa) | $\varepsilon_{tot}$ (%) | $\sigma_y$ (MPa) | $\varepsilon_y$ (%) | E (GPa) | $\rho$ (g/cm$^3$) | G (GPa) | CIT (J) | RoA (%) | $\nu$ |
|---|---|---|---|---|---|---|---|---|---|---|
| $Zr_{36.6}Ti_{31.4}Nb_7Cu_{5.9}Be_{19.1}$ (DH1) | 1512 | 9.58 | 1474 | 1.98 | 84.3 | 5.6 | 30.7 | 26 | 44 | 0.371 |
| $Zr_{38.3}Ti_{32.9}Nb_{7.3}Cu_{6.2}Be_{15.3}$ (DH2) | 1411 | 10.8 | 1367 | 1.92 | 79.2 | 5.7 | 28.8 | 40 | 50 | 0.373 |
| $Zr_{39.6}Ti_{33.9}Nb_{7.6}Cu_{6.4}Be_{12.6}$ (DH3) | 1210 | 13.10 | 1096 | 1.62 | 75.3 | 5.8 | 27.3 | 45 | 46 | 0.376 |

TABLE 3-continued

Material Properties of Select MG-Based Materials as a function of Composition

| Alloy | $\sigma_{max}$ (MPa) | $\varepsilon_{tot}$ (%) | $\sigma_y$ (MPa) | $\varepsilon_y$ (%) | E (GPa) | $\rho$ (g/cm$^3$) | G (GPa) | CIT (J) | RoA (%) | $\nu$ |
|---|---|---|---|---|---|---|---|---|---|---|
| Zr$_{41.2}$Ti$_{13.8}$Cu$_{12.5}$Ni$_{10}$Be$_{22.5}$ (Vitreloy 1) | 1737 | 1.98 | — | — | 97.2 | 6.1 | 35.9 | 8 | 0 | 0.355 |
| Zr$_{56.2}$Ti$_{13.8}$Nb$_{5.0}$Cu$_{6.9}$Ni$_{5.6}$Be$_{12.5}$ (LM 2) | 1302 | 5.49 | 1046 | 1.48 | 78.8 | 6.2 | 28.6 | 24 | 22 | 0.375 |

TABLE 4

Material Properties as a Function of Composition and Structure, where A is Amorphous, X, is Crystalline, and C is Composite

| | A/X/C | 2.0 Hv | E (GPa) |
|---|---|---|---|
| (CuZr42Al7Be10)Nb3 | A | 626.5 | 108.5 |
| (CuZr46Al5Y2)Nb3 | A | 407.4 | 76.9 |
| (CuZrAl7Be5)Nb3 | A | 544.4 | 97.8 |
| (CuZrAl7Be7)Nb3 | A | 523.9 | 102.3 |
| Cu40Zr40Al10Be10 | A | 604.3 | 114.2 |
| Cu41Zr40Al7Be7Co5 | C | 589.9 | 103.5 |
| Cu42Zr41Al7Be7Co3 | A | 532.4 | 101.3 |
| Cu47,5Zr48Al4Co0.5 | X | 381.9 | 79.6 |
| Cu47Zr45Al5Y2 | A | 409.8 | 75.3 |
| CuSOZrB0 | X | 325.9 | 81.3 |
| CuZr41AlBe7Cr3 | A | 575.1 | 106.5 |
| CuZrAl5Be5Y2 | A | 511.1 | 88.5 |
| CuZrAl5Ni3Be4 | A | 504.3 | 95.5 |
| CuZrAl7 | X | 510.5 | 101.4 |
| CuZrAl7Ag7 | C | 496.1 | 90.6 |
| CuZrAl7Ni5 | X | 570.0 | 99.2 |
| Ni40Zr28.5Ti16.5Be15 | C | 715.2 | 128.4 |
| Ni40Zr8.5Ti16.5Cu5Al10 | X | 627.2 | 99.3 |
| Ni40Zr28.5Ti16.5Cu5Be10 | C | 668.2 | 112.0 |
| Ni56Zr17Ti13Si2Sn3Be9 | X | 562.5 | 141.1 |
| Ni57Zr18Ti14Si2Sn3Be6 | X | 637.3 | 139.4 |
| Ti33.18Zr30.51Ni5.33Be22.88Cu8.1 | A | 486.1 | 96.9 |
| Ti40Zr25Be30Cr5 | A | 465.4 | 97.5 |
| Ti40Zr25Ni8Cu9Be18 | A | 544.4 | 101.1 |
| Ti45Zr16Ni9Cu10Be20 | A | 523.1 | 104.2 |
| Vit 1 | A | 530.4 | 95.2 |
| Vit105 (Zr52.5Ti5Cu17.9Ni14.6Al10) | A | 474.4 | 88.5 |
| Vit 106 | A | 439.7 | 83.3 |
| Zr55Cu30Al10NiS | A | 520.8 | 87.2 |
| Zr65Cu17.5Al7.5Ni10 | A | 463.3 | 116.9 |
| DH1 | C | 391.1 | 84.7 |
| GHDT (Ti30Zr35Cu8.28Be26.8) | A | 461.8 | 90.5 |

Figure 5:
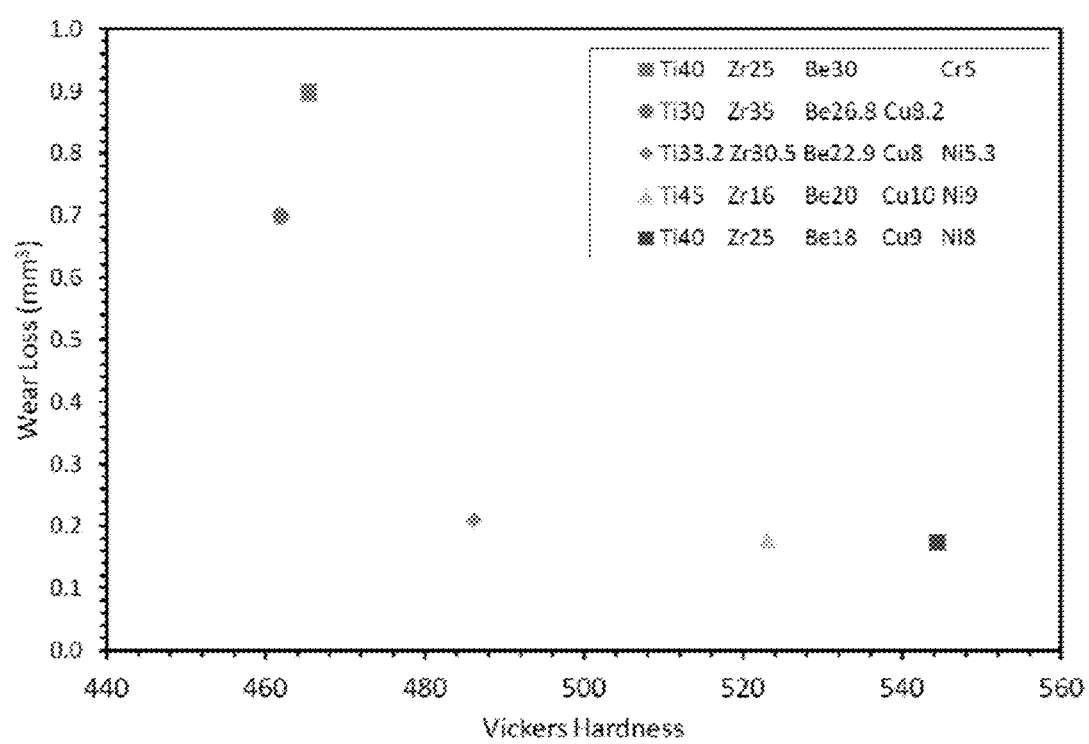
FIG. 5 illustrates the wear-resistance properties of titanium MG-based materials that can be implemented within strain wave gear components in accordance with certain embodiments of the invention.

FIG. 5 illustrates how the hardness of a titanium MG-based material varies in relation to the composition of the alloy. Generally, titanium MG-based alloys tend to possess a number of characteristics that make them particularly well-suited for the fabrication of strain wave gears and strain wave gear components. For example, such alloys can have relatively low densities, e.g. on the order of 4.5 g/cm$^3$. By contrast, many steel-based materials have densities on the order of 8 g/cm$^3$. Notably, crystalline Titanium based alloys may not be as suitable for implementation within strain wave gears, as many crystalline Titanium based alloys are characterized by: poor wear resistance, low hardness, and/or difficult machinability. Accordingly, by using titanium in the form of a metallic glass-based material, titanium can be viably implemented into strain wave gears and strain wave gearing components.

Tables 5 and 6 below list reported data as to how fatigue characteristics with MG-based materials vary as a function of composition.

TABLE 5

Fatigue Characteristics as a Function of Composition

| Material | Fracture Strength (MPa) | Geometry (mm) | Loading mode | Frequency (Hz) | R-ratio | Fatigue limit (MPa) | Fatigue ratio |
|---|---|---|---|---|---|---|---|
| Zr$_{56.2}$Cu$_{6.9}$Ni$_{5.6}$Ti$_{13.8}$Nb$_{5.0}$Be$_{12.5}$ Composites | 1480 | 3 × 3 × 30 | 4PB | 25 | 0.1 | −296 | 0.200 |
| Zr$_{41.2}$Cu$_{12.5}$Ni$_{10}$Ti$_{13.8}$Nb$_{5.0}$Be$_{22.5}$ | 1900 | 3 × 3 × 50 | 4PB | 25 | 0.1 | −152 | 0.080 |
| Zr$_{41.2}$Cu$_{12.5}$Ni$_{10}$Ti$_{13.8}$Nb$_{5.0}$Be$_{22.5}$ | 1900 | 2 × 2 × 60 | 3PB | 10 | 0.1 | 768 | 0.404 |
| Zr$_{41.2}$Cu$_{12.5}$Ni$_{10}$Ti$_{13.8}$Nb$_{5.0}$Be$_{22.5}$ | 1900 | 2 × 2 × 60 | 3PB | 10 | 0.1 | 359 | 0.189 |
| Zr$_{44}$Ti$_{11}$Ni$_{10}$Cu$_{10}$Be$_{25}$ | 1900 | 2.3 × 2.0 × 85 | 4PB | 5–20 | 0.3 | 550 | 0.289 |
| Zr$_{44}$T$_{11}$Ni$_{10}$Cu$_{10}$Be$_{25}$ | 1900 | 2.3 × 2.0 × 85 | 4PB | 5–20 | 0.3 | 390 | 0.205 |
| Zr$_{52.5}$Cu$_{17.9}$Al$_{10}$Ni$_{14.6}$Ti$_{5}$ | 1700 | 3.5 × 3.5 × 30 | 4PB | 10 | 0.1 | 850 | 0.500 |
| (Zr$_{58}$Ni$_{13.6}$Cu$_{18}$Al$_{10.4}$)$_{99}$Nb$_{1}$ | 1700 | 2 × 2 × 25 | 4PB | 10 | 0.1 | 559 | 0.329 |
| Zr$_{55}$Cu$_{30}$Ni$_{5}$Al$_{10}$ | 1560 | 2 × 20 × 50 | Plate bend | 40 | 0.1 | 410 | 0.263 |

TABLE 6

Fatigue Characteristics as a Function of Composition

| Material | Fracture Strength (MPa) | Geometry (mm) | Loading mode | Frequency (Hz) | R-ratio | Fatigue limit (MPa) | Fatigue ratio |
|---|---|---|---|---|---|---|---|
| Zr$_{56.2}$Cu$_{6.9}$Ni$_{5.6}$Ti$_{13.8}$Nb$_{5.0}$Be$_{12.5}$ Composites | 1480 | Ø2.98 | TT | 10 | 0.1 | 239 | 0.161 |

TABLE 6-continued

Fatigue Characteristics as a Function of Composition

| Material | Fracture Strength (MPa) | Geometry (mm) | Loading mode | Frequency (Hz) | R-ratio | Fatigue limit (MPa) | Fatigue ratio |
|---|---|---|---|---|---|---|---|
| $Zr_{55}Cu_{30}Ni_5Al_{10}$ Nano | 1700 | 2 × 4 × 70 | TT | 10 | 0.1 | −340 | 0.200 |
| $Zr_{41.2}Cu_{12.5}Ni_{10}Ti_{13.8}Nb_{5.0}Be_{22.5}$ | 1850 | Ø2.98 | TT | 10 | 0.1 | 703 | 0.380 |
| $Zr_{41.2}Cu_{12.5}Ni_{10}Ti_{13.8}Nb_{5.0}Be_{22.5}$ | 1850 | Ø2.98 | TT | 10 | 0.1 | 615 | 0.332 |
| $Zr_{41.2}Cu_{12.5}Ni_{10}Ti_{13.8}Nb_{5.0}Be_{22.5}$ | 1850 | Ø2.98 | TT | 10 | 0.1 | 567 | 0.306 |
| $Zr_{41.2}Cu_{12.5}Ni_{10}Ti_{13.8}Nb_{5.0}Be_{22.5}$ | 1900 | — | CC | 5 | 0.1 | −1050 | 0.553 |
| $Zr_{41.2}Cu_{12.5}Ni_{10}Ti_{13.8}Nb_{5.0}Be_{22.5}$ | 1900 | — | TC | 5 | −1 | −150 | 0.079 |
| $Zr_{50}Cu_{40}Al_{10}$ | 1821 | Ø2.98 | TT | 10 | 0.1 | 752 | 0.413 |
| $Zr_{50}Cu_{30}Al_{10}Ni_{10}$ | 1900 | Ø2.98 | TT | 10 | 0.1 | 865 | 0.455 |
| $Zr_{50}Cu_{37}Al_{10}Pd_3$ | 1899 | Ø2.98 | TT | 10 | 0.1 | 983 | 0.518 |
| $Zr_{50}Cu_{37}Al_{10}Pd_3$ | 1899 | Ø5.33 | TT | 10 | 0.1 | −900 | 0.474 |
| $Zr_{52.5}Cu_{17.9}Al_{10}Ni_{14.6}Ti_5$ | 1660 | 6 × 3 × 1.5 | TT | 1 | 0.1 | — | — |
| $Zr_{52.5}Cu_{17.9}Al_{10}Ni_{14.6}Ti_5$ | 1700 | Ø2.98 | TT | 10 | 0.1 | 907 | 0.534 |
| $Zr_{59}Cu_{20}Al_{10}Ni_8Ti_3$ | 1580 | 6 × 3 × 1.5 | TT | 1 | 0.1 | — | — |
| $Zr_{65}Cu_{15}Al_{10}Ni_{10}$ | 1300 | 3 × 4 × 16 | TT | 20 | 0.1 | −280 | 0.215 |
| $Zr_{65}Cu_{30}Al_{10}Ni_5$ | 1560 | 1 × 2 × 5 | TT | 0.13 | 0.5 | — | — |

Figure 4A:
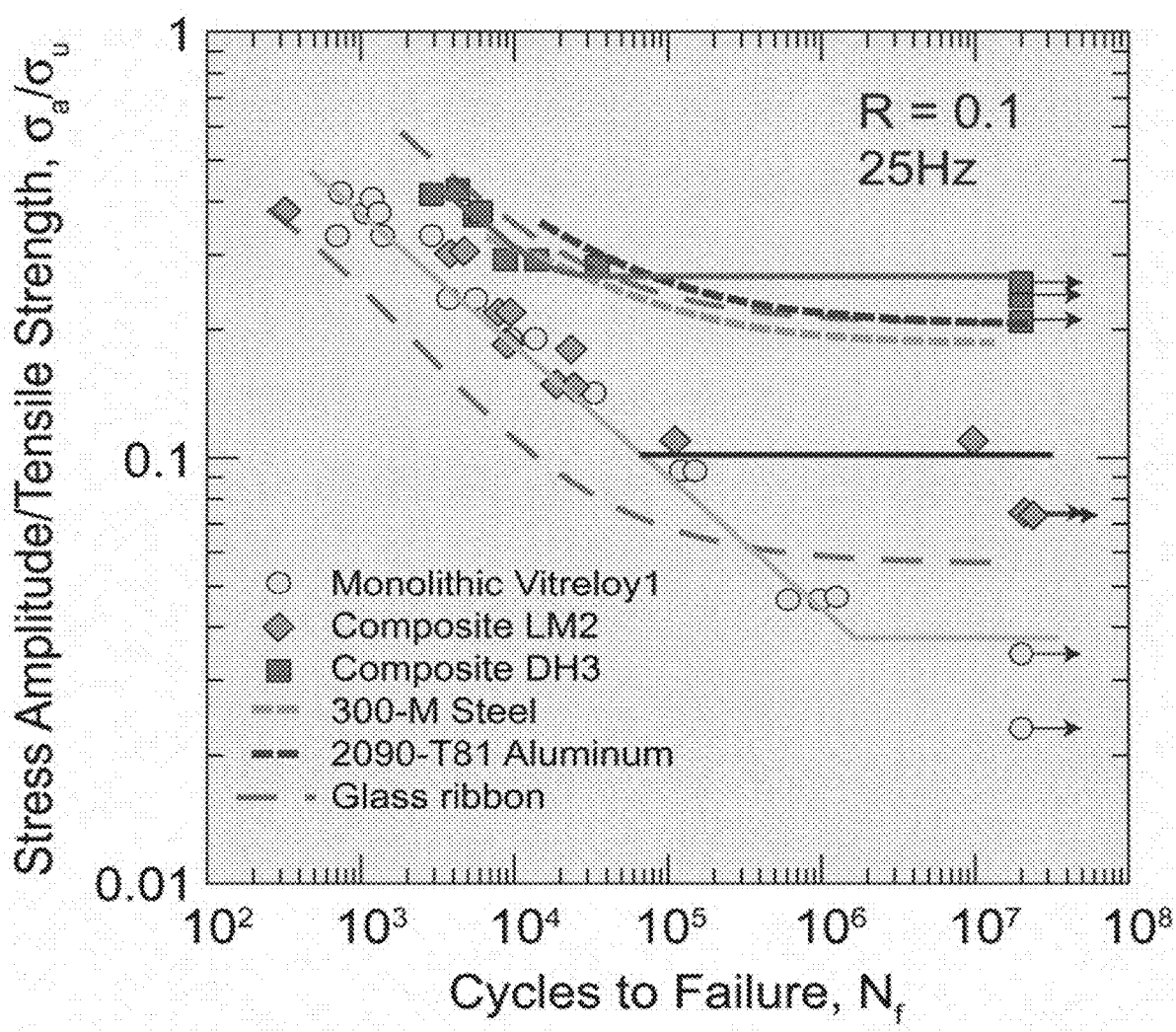
FIGS. 4A-4B illustrate the fatigue properties of MG-based materials that can be implemented within strain wave gear components in accordance with certain embodiments of the invention.
Figure 4B:
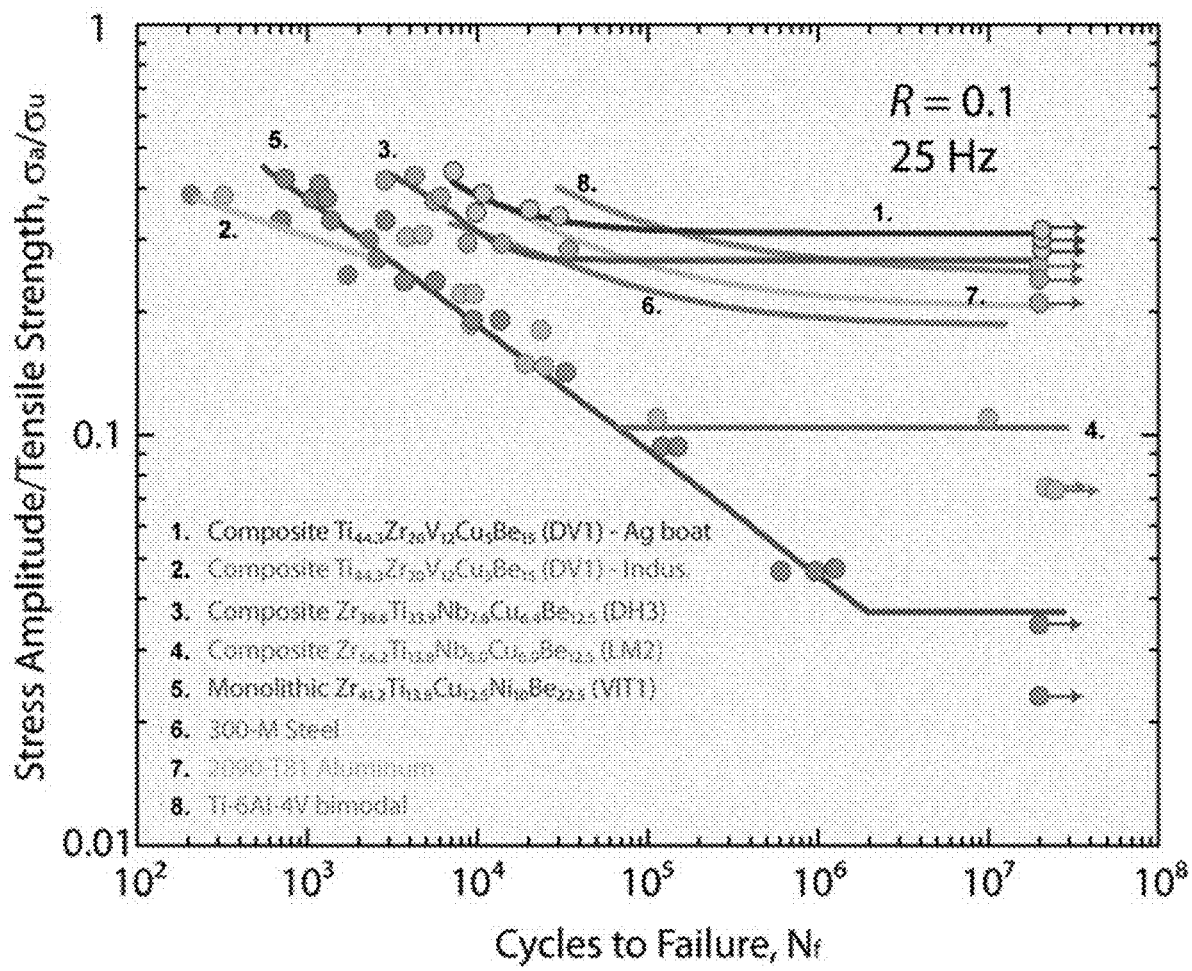

Although the data in tables 5 and 6 has been reported, one of the inventors of the instant application conducted independent fatigue tests, which to some extent contradict the reported values. FIGS. 4A and 4B depict the results of the conducted tests.

In particular, FIG. 4A illustrates the fatigue resistance of Monolithic Vitreloyl, Composite LM2, Composite DH3, 300-M Steel, 2090-T81 Aluminum, and Glass Ribbon. From these results, it is demonstrated that Composite DH3 exhibits a high resistance to fatigue failure. For example, Composite DH3 shows that it can survive approximately 20,000,000 cycles at a stress amplitude/tensile strength ratio of about 0.25. Note that monolithic Vitreloy 1 shows relatively poor resistance to fatigue failure, which appears to contravene the results shown in Tables 5 and 6. This discrepancy may be in part due to the rigor under which the data was obtained. In particular, as the inventor of the instant application realized that resistance to fatigue is a critical material property in determining suitability for various applications, he obtained fatigue resistance data that was procured under the most stringent testing conditions. FIG. 4A is reproduced from Launey, PNAS, Vol. 106, No. 13, 4986-4991, the disclosure of which is hereby incorporated by reference (and of which the one of the instant Inventors is a listed coauthor).

Similarly, FIG. 4B illustrates the fatigue resistance of DV1 ('Ag boat'—i.e., manufactured using semisolid processing), DV1 ('indus.'—manufactured using industry standard procedures), Composite DH3, Composite LM2, Monolithic Vitreloyl, 300-M Steel, 2090-T81 Aluminum, and Ti-6Al-4V bimodal. These results indicate that Composite DV1 (Ag boat) exhibits even greater resistance to fatigue failure than Composite DH3. Note that the results of the Composite DV1 testing varied greatly based on how the Composite DV1 was manufactured. When it was manufactured using 'Ag boat' techniques ('Ag boat' refers to semisolid manufacturing techniques, which are described in Hofmann, JOM, Vol. 61, No. 12, 11-17, the disclosure of which is hereby incorporated by reference.), it displayed far superior resistance to fatigue as compared to when it was manufactured using industry standard techniques. The inventors of the instant application believe that this discrepancy is due to the fact that industry standard manufacturing processes do not provide the type of rigor necessary to produce sufficiently pure materials, and this may be a function of the industry not recognizing how critical material composition is in determining material properties, including resistance to fatigue failure. FIG. 4B was produced by Launey in a collaboration that resulted in FIG. 4A, but FIG. 4B was not published in the above-cited article.

In general, FIGS. 4A and 4B indicate that MG-based materials can be developed to have better fatigue characteristics than steel and other heritage engineering materials. Importantly, FIGS. 4A and 4B depict relative stress amplitude stress ratios, and as can be gleaned from table 1, MG-based materials can be made to possess greater ultimate tensile strengths than many steels. Thus, MG-based materials can be made to withstand more loading cycles at higher stress levels than some steels. Moreover, as MG-based materials can be made to be less stiff, they can be made to experience less stress per unit deflection, which can thereby result in even greater fatigue performance.

From the above, it is clear that MG-based materials can possess advantageous materials properties that can make them very well-suited for implementation within strain wave gear components. Any of the listed MG-based materials can be implemented within strain wave gear components in accordance with certain embodiments of the invention. More generally, MG-based materials can be tailored (e.g. via alloying and/or heat treating) to obtain a material having the desired materials profile for implementation within a strain wave gear in accordance with embodiments of the invention. Generally, a desired material property profile can be determined for a respective strain wave gear component, and a MG-based material conforming to the material property profile can be developed and implemented.

For example, in many embodiments where a less stiff material is desired, the relative ratios of B, Si, Al, Cr, Co, and/or Fe within a MG-based composition is reduced. Similarly, in many embodiments where a less stiff material is desired, the volume fraction of soft, ductile dendrites is increased; or alternatively, the amount of beta stabilizing elements, e.g. V, Nb, Ta, Mo, and/or Sn, are increased. Generally, in metallic glass matrix composites, the stiffness of a material changes in accordance with the rule of mixtures, e.g., where there are relatively more dendrites, the stiffness decreases, and where there are relatively less dendrites, the stiffness increases. Note that, generally speaking, when modifying the stiffness of MG-based materials, the stiffness is modified largely without overly influencing other properties, e.g. elastic strain limit or the processability of the MG-based material. The ability to tune the stiffness independent of other material properties or influencing processability is greatly advantageous in designing strain wave gears and strain wave gear components.

Moreover, just as the stiffness of MG-based materials can be tuned, the resistance to fatigue failure can also be tuned in accordance with embodiments of the invention. The alloying elements used to improve resistance to fatigue failure are largely experimentally determined. However, it has been observed that the same processing techniques that are used to enhance fracture toughness also tend to beneficially influence resistance to fatigue failure. More generally, any of a variety of materials characteristics can be altered by appropriately alloying base materials. For instance, the hardness, toughness, fatigue life, corrosion resistance, etc., can be modified by appropriate alloying. In many instances, these characteristics can be independently tuned. This can enable great customizability for parts to be fabricated.

In any case, as should be clear from the above, any of the above-listed and described MG-based materials can be incorporated within strain wave gears and strain wave gear components in accordance with embodiments of the invention. More generally, any MG-based material can be implemented within strain wave gears and strain wave gear components in accordance with embodiments of the invention. For example, in many embodiments the implemented MG-based material is based in Fe, Zr, Ti, Ni, Hf, or Cu (i.e. those respective elements are present in the material in greater amounts than any other element). In some embodiments, a MG-based material that is implemented within a strain wave gear component is a Cu—Zr—Al—X composition, where X can be one or more element, including for example: Y, Be, Ag, Co, Fe, Cr, C, Si, B, Mo, Ta, Ti, V, Nb, Ni, P, Zn, and Pd. In several embodiments, a MG-based material that is implemented within a strain wave gear component is a Ni—Zr—Ti—X composition, where X can be one or more element, including for example Co, Al, Cu, B, P, Si, Be, and Fe. In a number of embodiments, a MG-based material that is implemented within a strain wave gear component is a Zr—Ti—Be—X composition, where X can be one or more element, including for example Y, Be, Ag, Co, Fe, Cr, C, Si, B, Mo, Ta, Ti, V, Nb, Ni, P, Zn, and Pd. In some embodiments, a strain wave gear component includes a MG-based material that is $Ni_{40}Zr_{28.5}Ti_{16.5}Al_{10}Cu_5$ (atomic percent). In several embodiments a strain wave gear component includes a MG-based material that is $(Cu_{50}Zr_{50})_xAl_{1-12}Be_{1-20}Co_{0.5-5}$. In many embodiments, a desired materials profile is determined for a given strain wave gear component, and a MG-based material that possess the desired characteristics is used to construct the strain wave gear component. As MG-based materials can possess many advantageous traits, their implementation within strain wave gear components can result in much more robust strain wave gears. The design methodology and fabrication of MG-based strain wave gears is now discussed in greater detail below.

Fabrication of Metallic Glass-Based Strain Wave Gears and Strain Wave Gear Components In many embodiments of the invention, strain wave gear components are fabricated from MG-based materials using casting or thermoplastic forming techniques. Using casting or thermoplastic forming techniques can greatly enhance the efficiency by which strain wave gears and strain wave gear components are fabricated. For example, steel-based strain wave gear components are typically machined; because of the intricacy of the constituent components, the machining costs can be fairly expensive. By contrast, using casting or thermoplastic forming techniques in the development of strain wave gear components can circumvent excessive costly machining processes.

Figure 6:
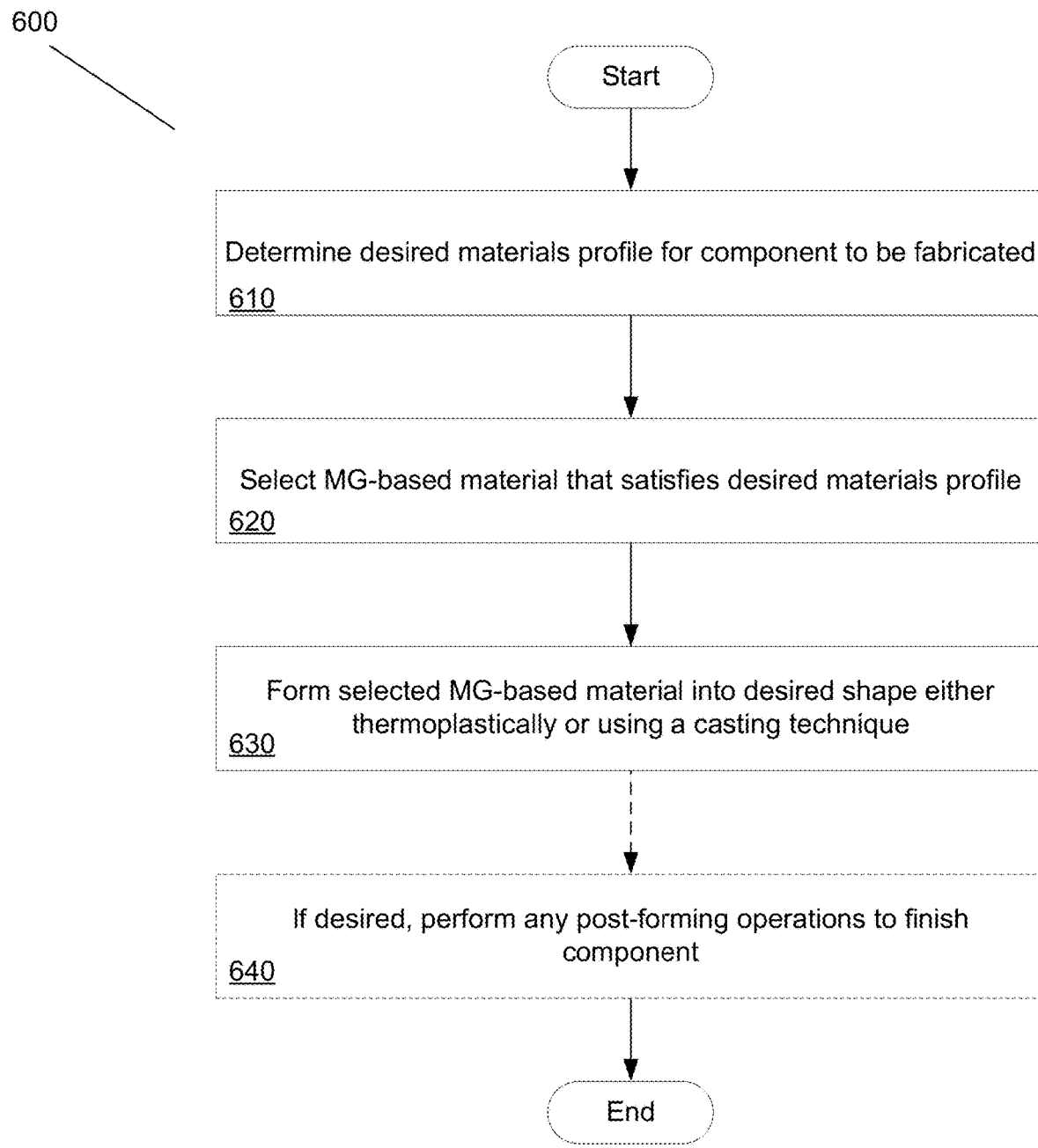
FIG. 6 illustrates a method of forming a MG-based strain wave gear component in accordance with certain embodiments of the invention.

A method of fabricating a strain wave gear component that incorporates casting or thermoplastic forming techniques is illustrated in FIG. 6. The process includes determining 610 a desired materials profile for the component to be fabricated. For example, where a flexspline is to be fabricated, it may be desired that the constituent material have a certain stiffness, a certain resistance to fatigue failure, a certain density, a certain resistance to brittle failure, a certain resistance to corrosion, a certain resistance to wear, a certain level of glass-forming ability, etc. In many embodiments, material costs are also accounted for (e.g. certain MG-based may be more or less expensive than other MG-based materials). Generally, any parameters can be accounted for in determining 610 the materials profile for the component to be fabricated.

Note that any constituent component of a strain wave gear can be fabricated in accordance with embodiments of the invention. As alluded to above, because the flexspline and the ball bearing are subject to periodic deformation, it may be particularly advantageous that they be formed from a material having a high resistance to fatigue failure. Moreover, flexsplines and ball bearings may also benefit from being formed from a material that possesses excellent resistance to wear, since those components experience constant contact and relative motion during the normal operation of a strain wave gear (the gear teeth of the flexspline are subject to wear and the balls and inner and outer races of the ball bearing may experience wear). In some embodiments the balls of the ball bearing are fabricated from MG-based materials—in this way, the balls of the ball bearing can benefit from the enhanced wear resistance that MG-based materials can offer.

But it should be clear that any of the components of a strain wave gear can be fabricated from MG-based materials in accordance with embodiments of the invention. In some embodiments, the gear teeth of the circular spline are fabricated from MG-based materials. In this way, the gear teeth of the circular spline can benefit from the enhanced wear-performance characteristics that MG-based materials can offer. In some embodiments, the gear teeth of the circular spline that are fabricated from a MG-based material are thereafter press-fit into a different, stiffer material—for example beryllium and titanium—to form the circular spline, bearing in mind that it would be beneficial for the circular spline to be relatively rigid to support the motion of the flexspline and the wave generator. In this way, MG-based materials are implemented in the gear teeth of the circular spline where they can offer enhanced wear performance, and a stiffer material can form the remainder of the circular spline where it can offer enhanced structural support.

In many embodiments, the majority of the constituent components of a strain wave gear are fabricated from the same MG-based materials—in this way, the respective strain wave gear can have a more uniform coefficient of thermal expansion. In any case, it should be clear that any of the constituent components of a strain wave gear can be fabricated from a MG-based material in accordance with embodiments of the invention.

Returning to FIG. 6, a MG-based material is selected 620 that satisfies the determined materials profile. Any suitable MG-based material can be selected, including any of those listed above in Tables 1-5, and depicted in FIGS. 4A-4B and 5. In many embodiments, MG-based materials are particularly developed to satisfy the determined 610 materials profile, and are thereby selected 620. For example, in many embodiments, given MG-based materials are developed by alloying (e.g. as discussed above) in any suitable way to tweak the materials properties. In a number of embodiments, a MG-based material is developed by modifying the ratio of crystalline structure to amorphous structure (e.g. as discussed above) to tweak the materials properties. Of course, any suitable way of developing MG-based materials that satisfy the determined 610 materials properties may be implemented in accordance with embodiments of the invention.

Figure 7A:
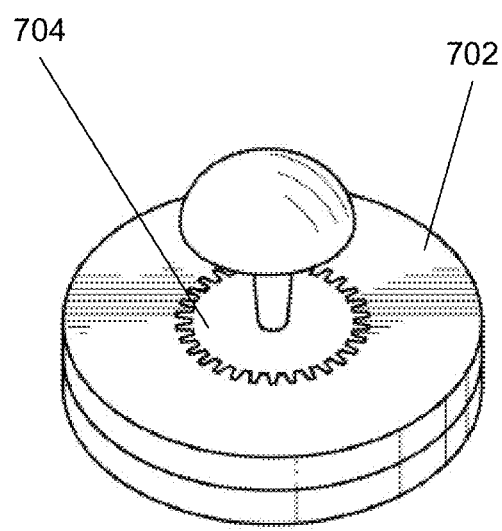
FIGS. 7A-7D illustrate the formation of a gear using casting techniques in accordance with certain embodiments of the invention.
Figure 7B:
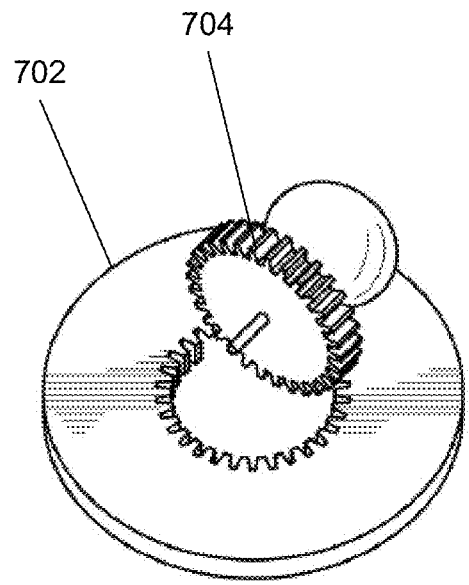
Figure 7C:
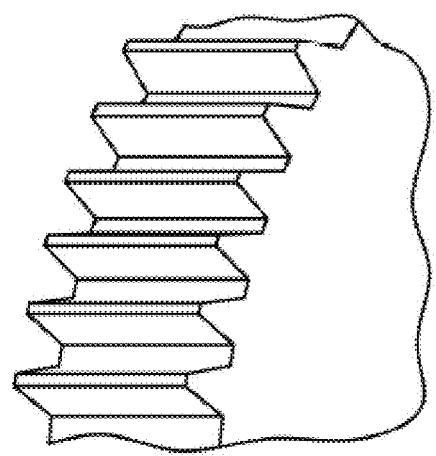
Figure 7D:
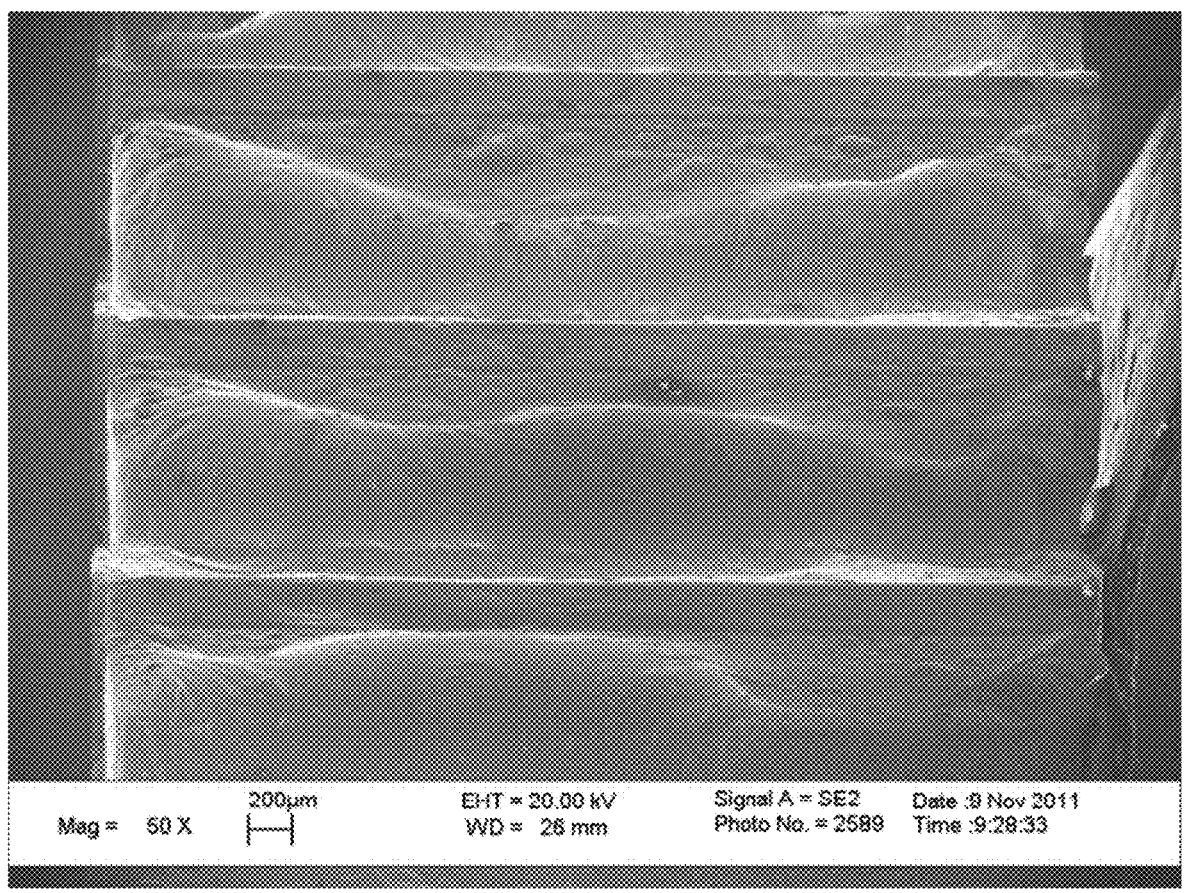

The selected 620 MG-based material is formed into the desired shape (e.g. the shape of the component to be fabricated), for example thermoplastically or using a casting technique. While the fabrication of gear-type components from MG-based materials via casting and/or thermoplastic techniques is not currently widespread, the inventors of the instant application have demonstrated the viability of such techniques for this purpose. For example, FIGS. 7A-7D schematically illustrate a gear having a 1 inch radius that had been fabricated from a MG-based material using a single casting step. In particular, FIG. 7A illustrates the steel mold 702 that was used in the formation of the gear. FIG. 7B illustrates removal of the metallic glass matrix composite material 704 from the steel mold 702. FIG. 7C is a reproduction of an SEM image that was taken of the fabricated gear. FIG. 7D depicts an SEM image demonstrating the fidelity of the fabricated component. Notably, the gear teeth were also implemented using this method of fabrication. In this way, the intricate and expensive machining of the gear teeth can be avoided (by contrast, steel-based strain wave gear components typically rely on machining in the formation of the component). Thus, in accordance with this teaching, in many embodiments, MG-based materials are thermoplastically formed or cast into the shapes of the constituent components of a strain wave gear. In many embodiments, MG-based materials are thermoplastically formed or cast into the shapes of the constituent components including the shapes of the gear teeth. Note also that any suitable thermoplastic forming or casting technique can be implemented in accordance with embodiments of the invention. For example, the constituent components of a strain wave gear can be formed by one of: a direct casting technique, a forging technique, a spin forming technique, a blow molding technique, a centrifugal casting technique, a thermoplastic forming technique using MG-based powder, etc. As one of ordinary skill in the art would appreciate, the MG based material must be cooled sufficiently rapidly to maintain at least some amorphous structure. Of course it should be noted that strain wave gear components can be formed from MG-based materials in any suitable manner, including by machining, in accordance with embodiments of the invention.

Figure 8A:
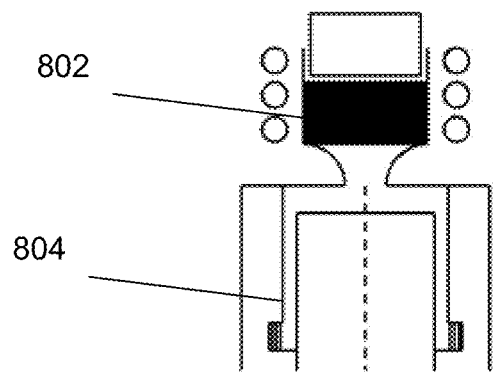
FIGS. 8A-8D illustrate the fabrication of a strain wave gear component using a casting technique in accordance with certain embodiments of the invention.
Figure 8B:
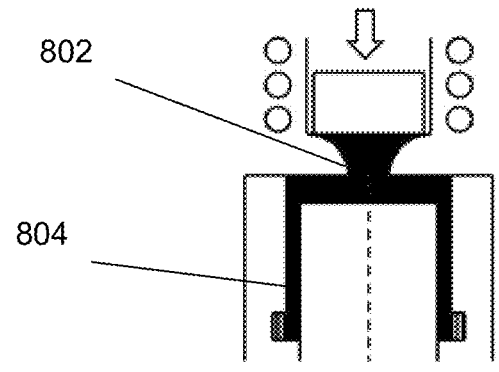
Figure 8C:
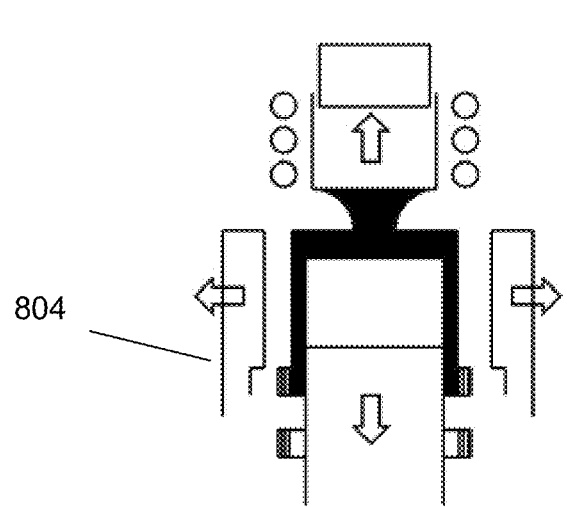
Figure 8D:
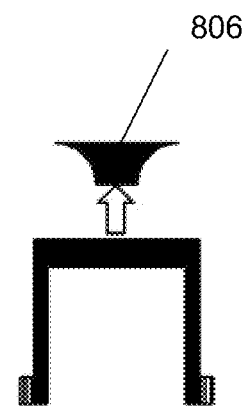

As an example, FIGS. 8A-8D illustrate a direct casting technique that can be implemented to form a constituent component of a strain wave gear in accordance with embodiments of the invention. In particular, FIG. 8A depicts that a molten MG-based material 802 that has been heated to a molten state and is thereby ready to be inserted into a mold 804. The mold 804 helps define the shape of the component to be formed. FIG. 8B depicts that the molten MG-based material 802 is pressed into the mold 804. FIG. 8C depicts that the mold 804 is released after the MG-based material has cooled. FIG. 8D depicts that any excess flash 806 is removed. Thus, it is depicted that a strain wave gear component can be fabricated using direct casting techniques in conjunction with a MG-based material in accordance with embodiments of the invention. Note that it is generally not feasible to cast crystalline metals that are suitable for implementation within strain wave gear components.

Figure 9A:
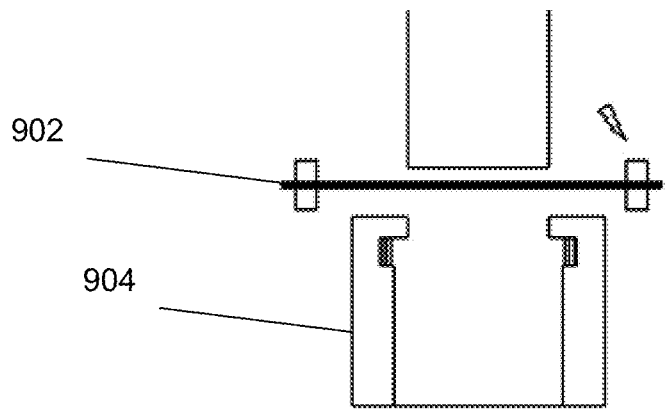
FIGS. 9A-9C illustrate the fabrication of a strain wave gear component using a MG-based material in the form of a sheet in conjunction with a thermoplastic forming technique in accordance with certain embodiments of the invention.
Figure 9B:
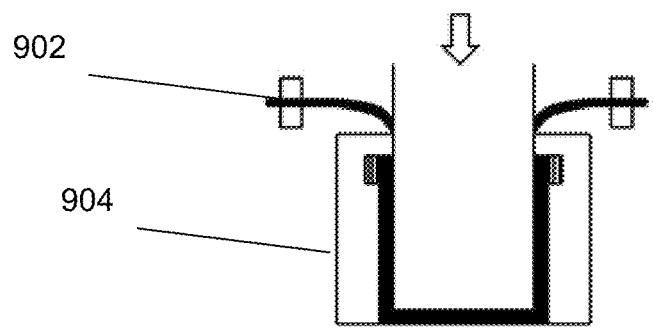
Figure 9C:
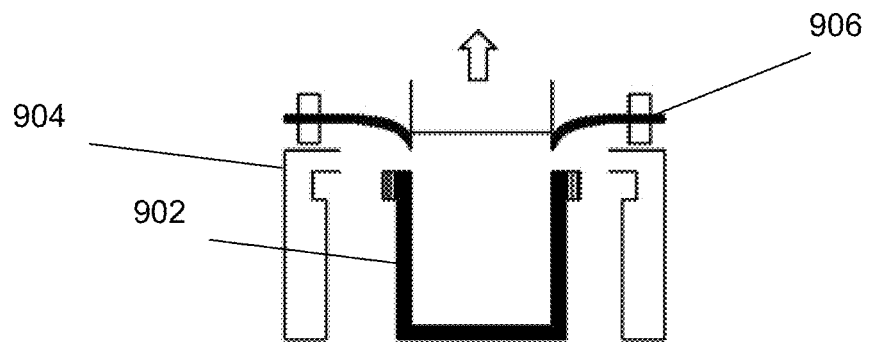

FIGS. 9A-9C illustrate another forming technique that can be implemented in accordance with embodiments of the invention. In particular, FIGS. 9A-9C illustrate the thermoplastic forming of a MG-based material that is in the form of a sheet in accordance with embodiments of the invention. Specifically, FIG. 9A depicts that a sheet of MG-based material 902 that has been heated such that thermoplastic forming can be implemented. In the illustrated embodiment, the sheet of MG-based material 902 is heated via a capacitive discharge technique, but it should be understood that any suitable method of heating can be implemented in accordance with embodiments of the invention. FIG. 9B depicts that a press is used to force the MG-based material into the mold 904 to form the component to be fabricated. FIG. 9C depicts that the mold 904 is released and any excess flash 906 is removed. Thus, the desired component is achieved.

Figure 10A:
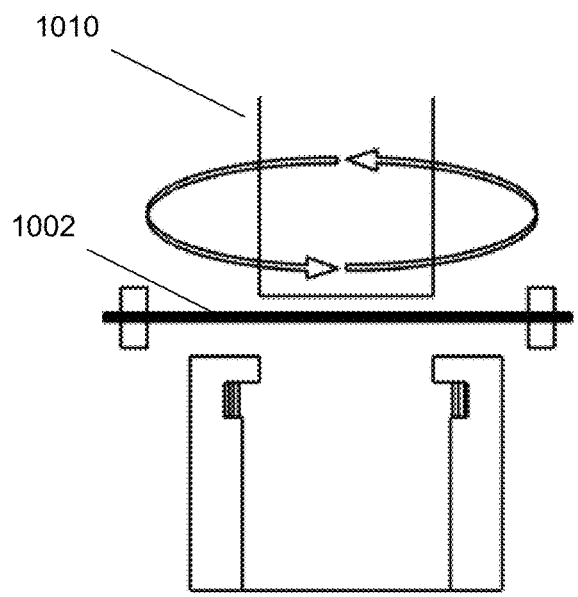
FIGS. 10A-10C illustrate the fabrication of a strain wave gear component using a spin forming technique in accordance with certain embodiments of the invention.
Figure 10B:
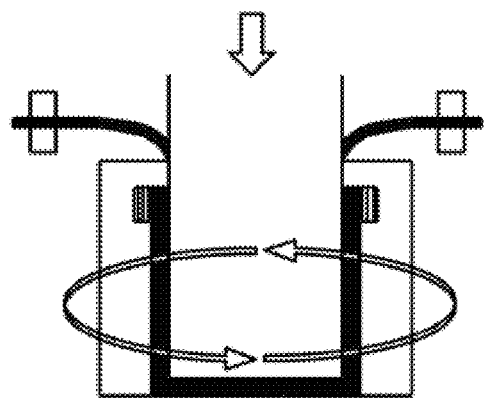
Figure 10C:
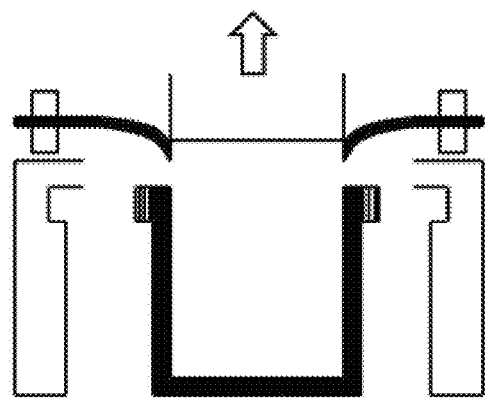

As mentioned above, the heating of the MG-based material so that it is capable of thermoplastic forming can be achieved in any suitable way in accordance with embodiments of the invention. For example, FIGS. 10A-10C depict that the heating of MG-based material in the form of a sheet can be accomplished by spinning friction. FIGS. 10A-10C are similar to those seen in FIGS. 9A-9C except that the MG-based sheet material is heated frictionally by the rotation of the press 1010 as it is pressed against the MG-based material 1002. In this way, the MG-based material can be heated to an extent that it can be thermoplastically formed. This technique has been referred to as 'spin forming.'

Note that although the above descriptions regard mechanically conforming MG-based material to mold, MG-based material can be formed into a mold in any suitable way in accordance with embodiments of the invention. In many embodiments, the MG-based material is made to conform to the mold using one of: a forging technique, a vacuum-based technique, a squeezing technique, and a magnetic forming technique. Of course, the MG-based material can be made to conform to a mold in any suitable fashion in accordance with embodiments of the invention.

Figure 11A:
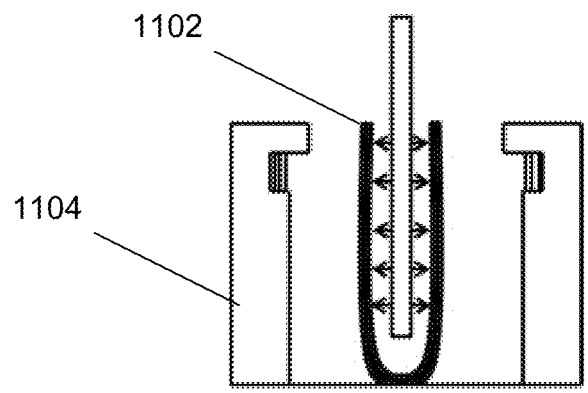
FIGS. 11A-11C illustrate the fabrication of a strain wave gear component using a blow molding technique in accordance with certain embodiments of the invention.
Figure 11B:
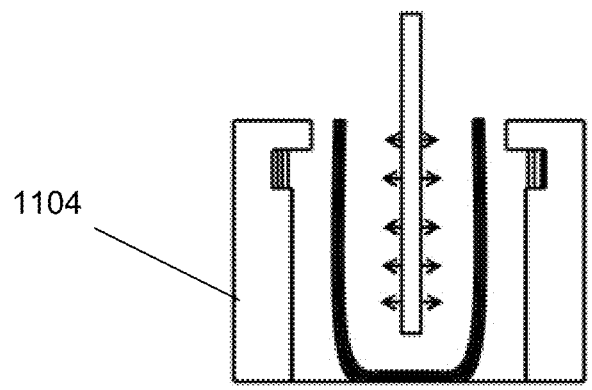
Figure 11C:
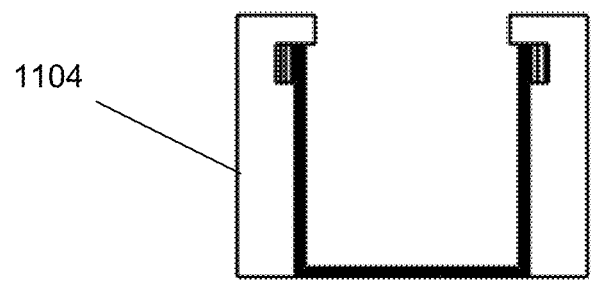

FIGS. 11A-11C depict the forming a part using blow molding techniques. In particular, FIG. 11A depicts that a MG-based material is placed within a mold. FIG. 11B depicts that the MG-based material 1102 is exposed to pressurized gas or liquid that forces the MG-based material to conform to the shape of the mold 1104. Typically, a pressurized inert gas is used. As before, the MG-based material 1102 is usually heated so that it is sufficiently pliable and can be influenced by the pressurized gas or liquid. Again, any suitable heating technique can be implemented in accordance with embodiments of the invention. FIG. 11C depicts that due to the force of the pressurized gas or liquid, the MG-based material conforms to the shape of the mold 1104.

Figure 12A:
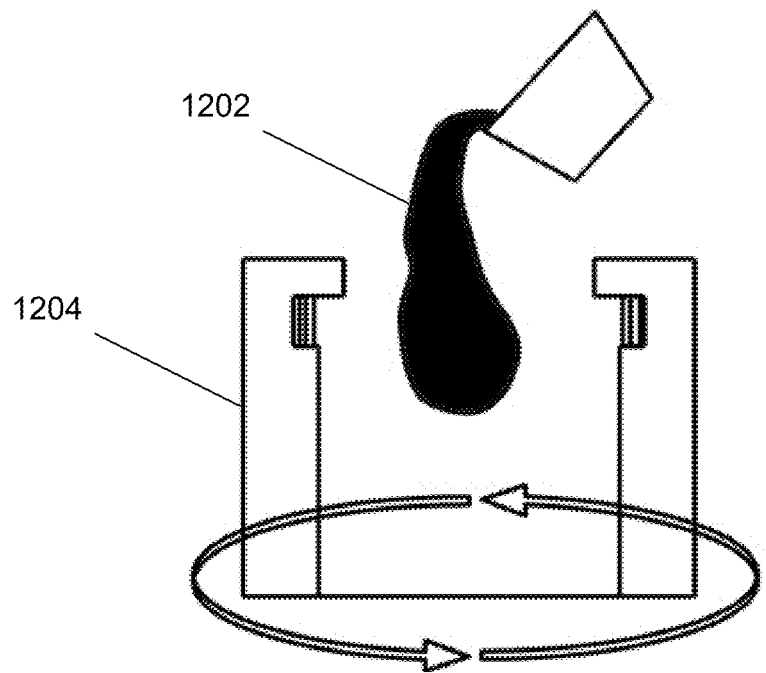
FIGS. 12A-12B illustrate using centrifugal casting to form a strain wave gear component in accordance with certain embodiments of the invention.
Figure 12B:
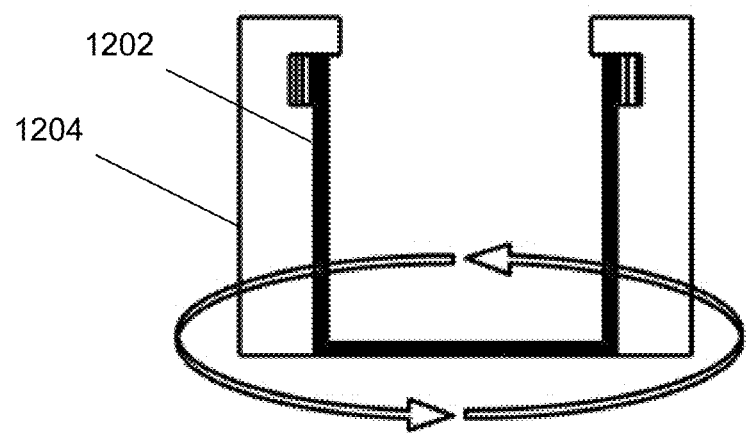

FIGS. 12A and 12B depict that centrifugal casting can be implemented to form the constituent component of the strain wave gear. In particular, FIG. 12A depicts that molten MG-based material 1202 is poured into a mold 1204, and that the mold is rotated so that the molten MG-based material conforms to the shape of the mold.

FIGS. 13A-13C depict that MG-based material can be inserted into a mold in the form of powder, subsequently heated so that the material is thermoplastically formable, and thereby made to form the shape of the desired constituent component in accordance with embodiments of the invention. In particular, FIG. 13A depicts that MG-based material in the form of powder 1302 is deposited within a mold. FIG. 13B depicts that the MG-based material 1302 is heated and pressed so as to conform to the shape of the mold 1304. And FIG. 13C depicts that the MG-based material has solidified and thereby formed the desired component.

In general, it should be clear that any suitable technique for thermoplastically forming or casting the MG-based material can be implemented in accordance with embodiments of the invention. The above-described examples are meant to be illustrative and not comprehensive. Even more generally, any suitable technique for forming a strain wave gear component that constitutes a MG-based material can be implemented in accordance with embodiments of the invention.

Figure 14:
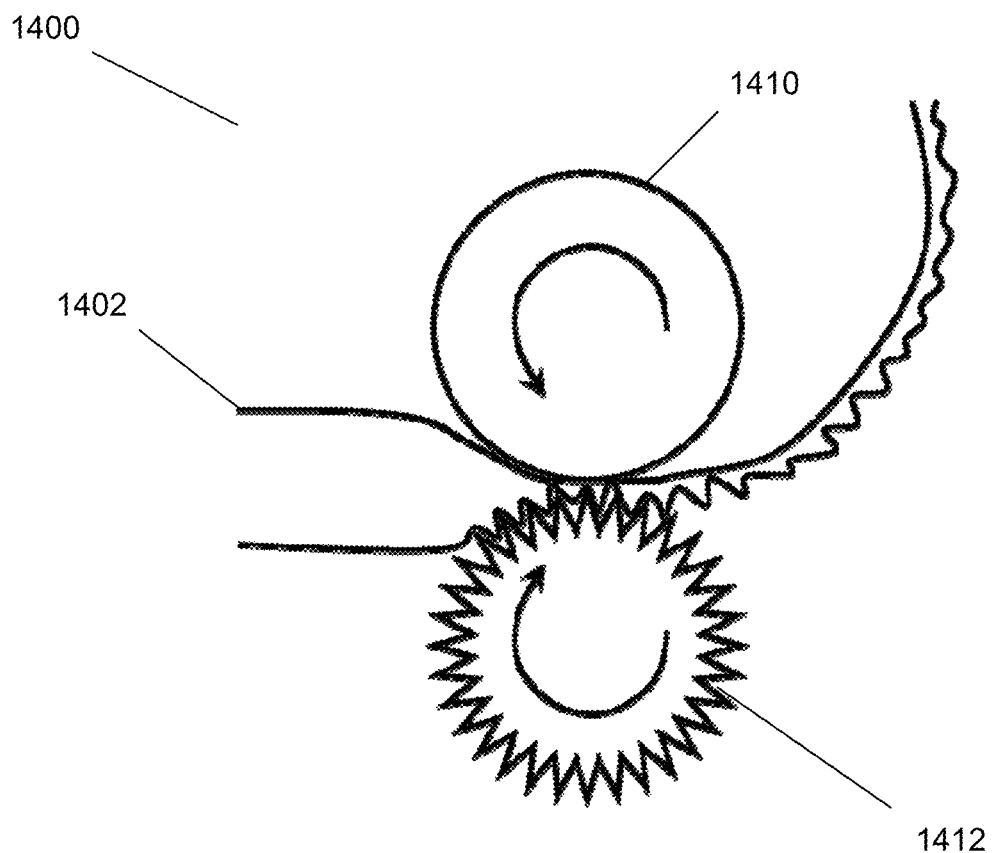
FIG. 14 illustrates using twin roll forming to implement gear teeth onto a MG-based strain wave gear component in accordance with certain embodiments of the invention.

Referring back to FIG. 6, the process 600 further includes, if desired, performing 640 any post-forming operations to finish the fabricated component. For example, in some embodiments, the general shape of a flexspline is thermoplastically formed or cast, and gear teeth are subsequently machined onto the flexspline. In some embodiments a twin-roll forming technique is implemented to install gear teeth onto a flexspline or a circular spline. FIG. 14 depicts a twin roll forming arrangement that can be used to implement gear teeth onto a flexspline. In particular, the arrangement 1400 includes a first roller that supports the motion of a flexspline 1402 through the arrangement, and a second roller 1412 that acts to define the gear teeth onto the flexspline. The flex spline 1402 can be heated so that it is more pliable and ready to be defined by the second roller. Of course, the formed part can be finished using any suitable technique in accordance with embodiments of the invention. For example, gear teeth can be implemented using traditional machining techniques. Additionally, the formed part can be finished in any suitable way—not just to define gear teeth—in accordance with embodiments of the invention.

Figure 15A:
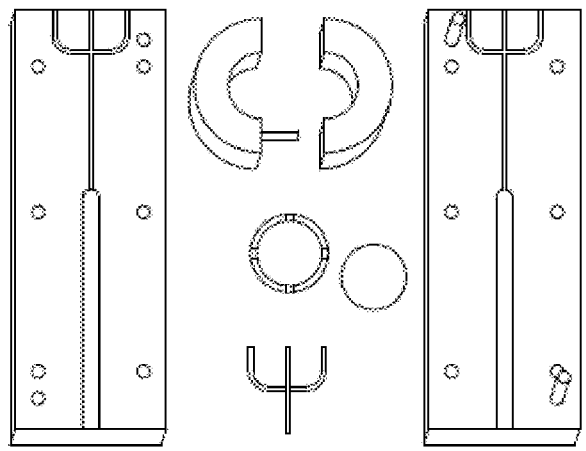
FIGS. 15A-15F illustrate the formation of a flexspline according to the process outlined in FIG. 6 in accordance with certain embodiments of the invention.
Figure 15B:
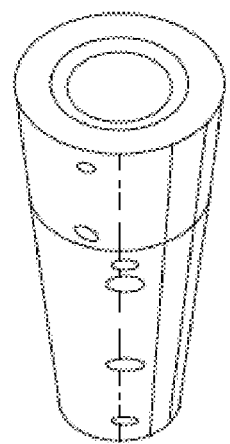
Figure 15C:
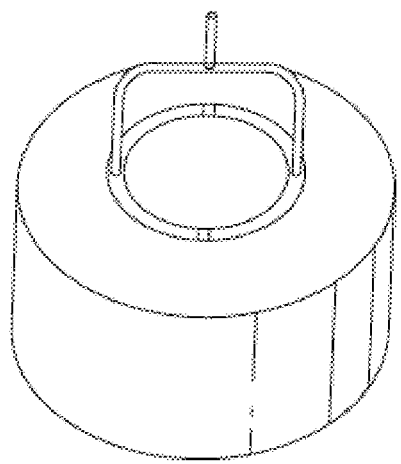
Figure 15D:
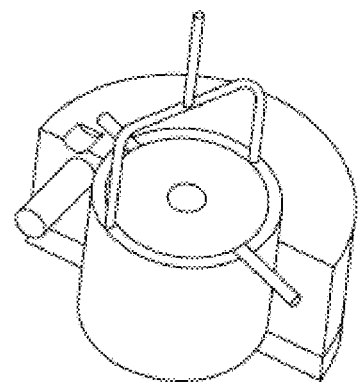
Figure 15E:
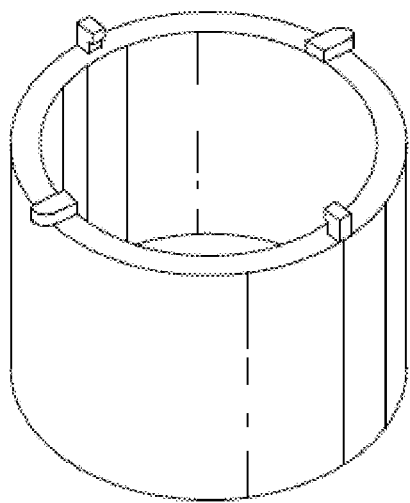
Figure 15F:
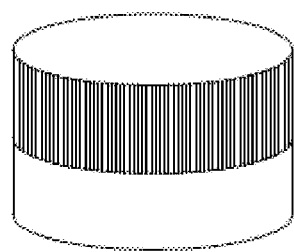

FIGS. 15A-15F illustrate the fabrication of a flexspline in accordance with the process outlined in FIG. 6. In particular: FIG. 15A depicts a multi-piece mold that is used to cast the general shape of the flexspline; FIG. 15B depicts the assembled multi-piece mold that is used to cast the general shape of the flexspline; FIG. 15C illustrates the casting of the flexspline using MG-based material; FIG. 15D illustrates the disassembling the mold; FIG. 15E illustrates the flexspline as it has been removed from the mold; and FIG. 15F illustrates that a flexspline can be machined to include gear teeth after being cast from a MG-based material. Bear in mind that although the illustration depicts that gear teeth are machined onto the flexspline, the flexspline could have been cast to include the desired gear teeth. In this way, costly machining processes can be avoided.

Figure 16:
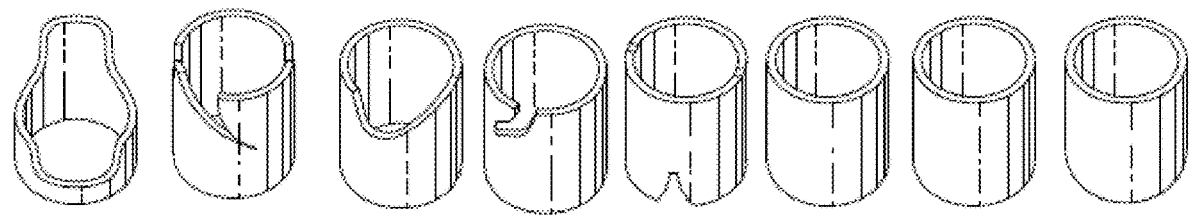
FIG. 16 illustrate that casting processes should be well-controlled in fabricating a strain wave gear component in accordance with certain embodiments of the invention.

Note that the formation techniques are extremely sensitive to process control. In general, it is beneficial to have precise control over the fluid flow, venting, temperature, and cooling when forming the part. For example, FIG. 16 schematically illustrates several attempts at forming the flexspline using a casting technique, and many of the attempts are clearly imperfect. In particular, the 7 samples to the left of the image were fabricated using a TiZrCuBe MG-based material having a density of 5.3 g/cm$^3$. The right-most sample in the image was fabricated from Vitreloy 1.

Figure 17:
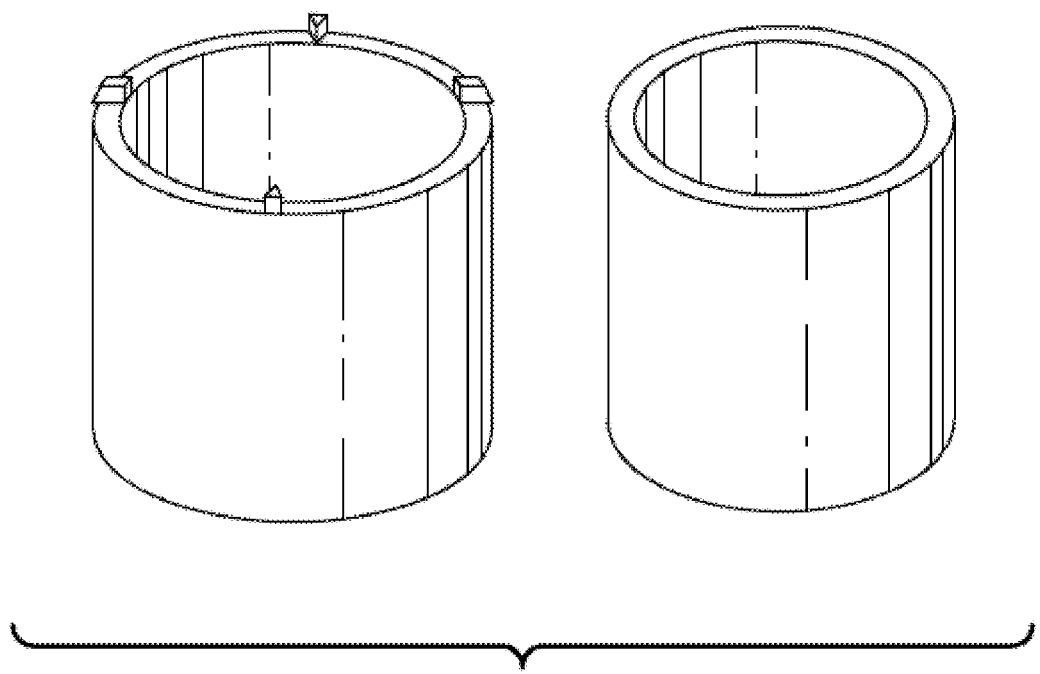
FIG. 17 illustrates that strain wave gear components can be fabricated on any suitable scale in accordance with certain embodiments of the invention.

FIG. 17 illustrates that the above-described processes can be used to create parts of varying scale. As an example, FIG. 17 illustrates a larger flexspline fabricated in accordance with the above-described processes, as well as a smaller flexspline fabricated in accordance with the above-described processes. In this way, the above-described processes are versatile.

Figure 18A:
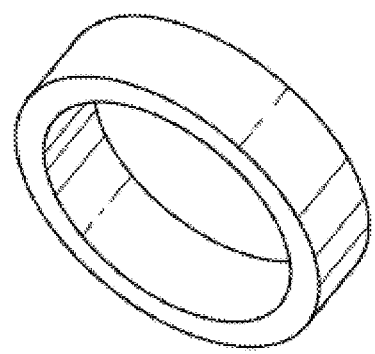
FIGS. 18A-18B illustrate the fabrication of a circular spline in accordance with certain embodiments of the invention.
Figure 18B:
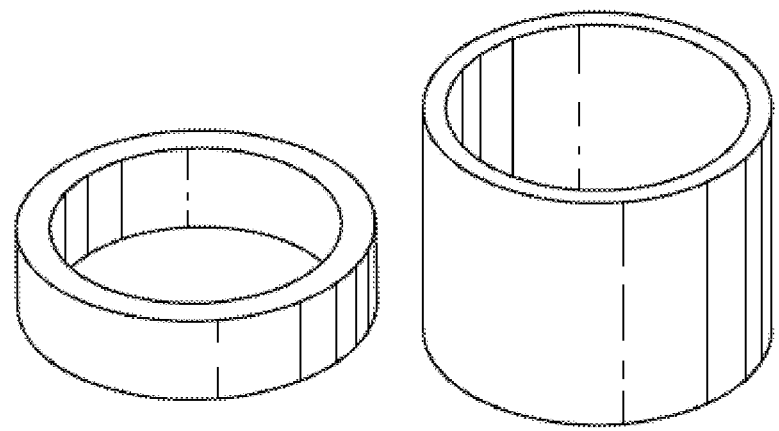

It should be understood that although FIGS. 15-17 regard the fabrication of a flexspline, any strain wave gear component can be fabricated from a MG-based material in accordance with embodiments of the invention. For example, FIGS. 18A-18B illustrate a circular spline that has been fabricated from a MG-based material. Specifically, FIG. 18A illustrates a titanium MG-based material that has been formed into a 1.5" circular spline; FIG. 18B depicts the fabricated circular spline relative to a fabricated flexspline. Although the circular spline is not depicted as including gear teeth, gear teeth can subsequently be machined into the circular spline.

The above-described fabrication techniques can be used to efficiently fabricate strain wave gears and strain wave gear components. For example, as alluded to above, expenses associated with machining the components can be avoided using these techniques. Accordingly, the cost for fabricating a given strain wave gear component becomes principally a function of the cost of the raw material, and this can be the case irrespective of the size of the component. By contrast, when steel-based strain wave gear components are formed, the cost of manufacturing the part may increase with a reduction in size beyond some critical value. This is because it becomes difficult to machine parts of a smaller size.

Figure 19:
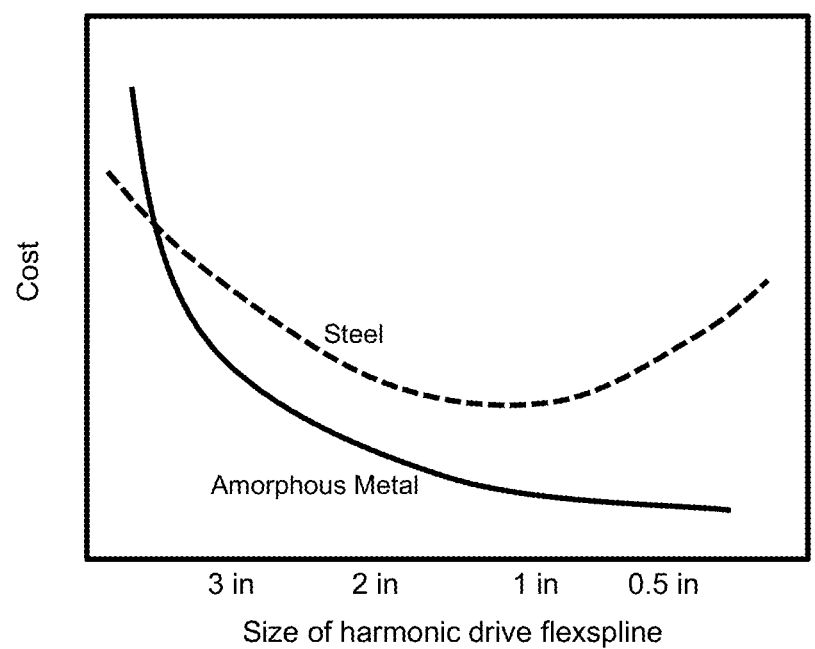
FIG. 19 illustrates the cost benefits of casting or thermoplastically forming strain wave gear components from MG-based materials in accordance with certain embodiments of the invention.
Figure 20:
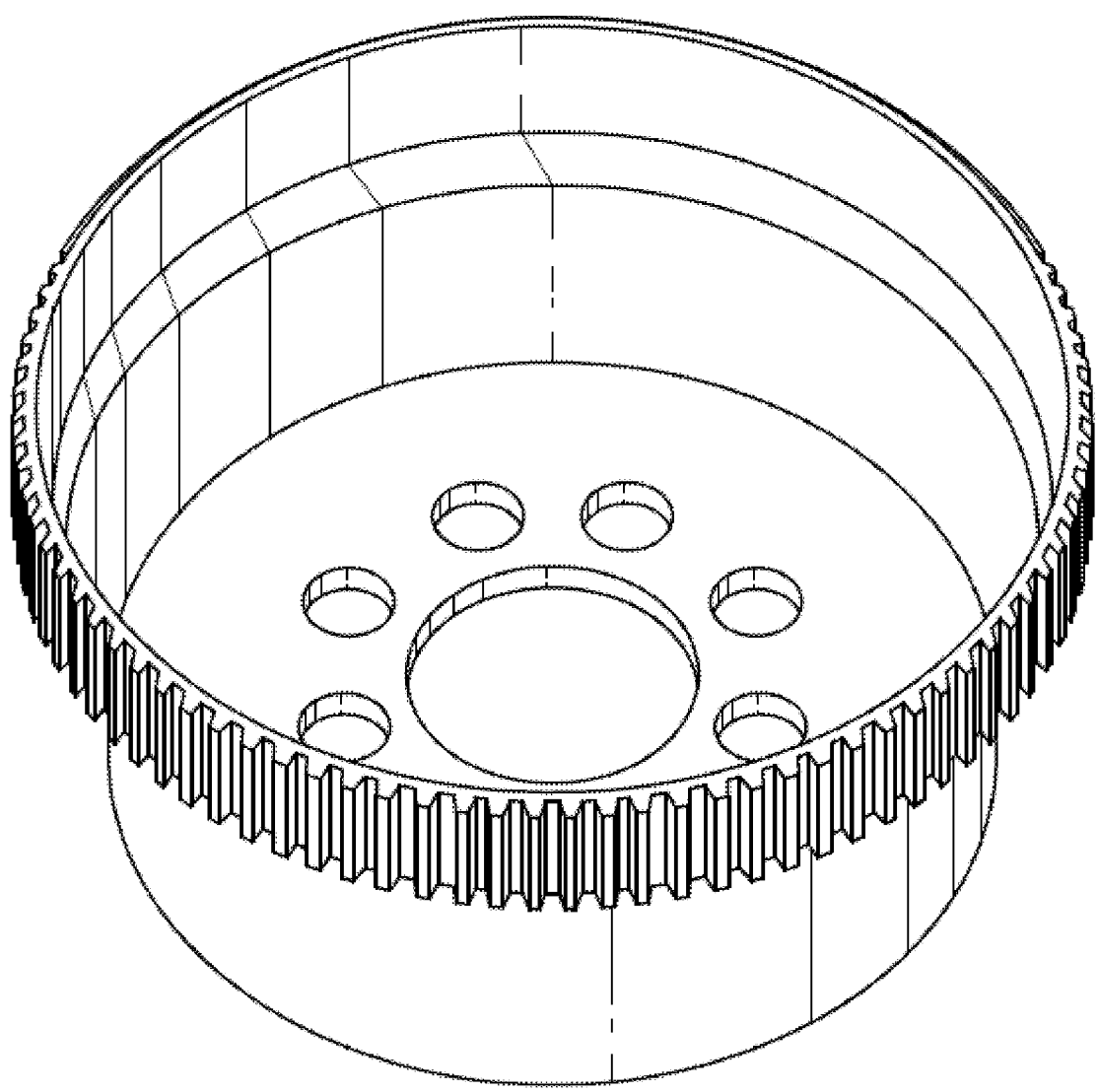
FIG. 20 illustrates a steel-based flexspline.

By way of example, FIG. 19 illustrates this relationship with respect to flexsplines where the cost of raw material for amorphous metal is greater than that of steel. For example, the stiffness of steel may require that flexsplines have a diameter less than some specified amount, e.g. 2 inches, and have a wall thickness of less than some amount, e.g. 1 mm. To provide context, FIG. 20 illustrates a steel-based flexspline 2" in diameter and having a wall thickness of 0.8 mm. Importantly, as flexsplines are made smaller, e.g. below 1 inch in diameter, the wall of the steel becomes too thin to machine easily. As a result, even where the cost of the amorphous metal raw material is greater than that of steel, the flexspline can be cheaper to manufacture from amorphous metal. In essence, burdensome machining could be eliminated by casting the part from a MG-based material, and the cost of the flexspline can thereby be reduced.

Customized Manufacturing Processes for the Fabrication of Tailored Metallic Glass-Based Materials As can be appreciated from the above discussion, the implementation of MG-based materials into strain wave gears and strain wave gearing components can confer a host of advantages. For example, as already alluded to above, the implementation of metallic glass-based materials can result in the creation of more robust strain wave gears and strain wave gearing components. Moreover, as also alluded to above, metallic glass-based materials are amenable to casting and other thermoplastic manufacturing strategies, which can be much more efficient manufacturing techniques relative to conventional techniques typically employed in constructing conventional steel-based strain wave gears (e.g. machining). In many embodiments of the invention, the information discussed above is used to implement unique manufacturing strategies to produce highly customized strain wave gears. For example, MG-based materials can be made to possess unique materials property profiles, and these materials profiles can influence design considerations.

For instance, in many embodiments, robust metallic glass-based strain wave gears having a relatively smaller dimension—e.g. having flexsplines characterized by a major diameter of less than approximately 4 inches—are implemented using MG-based materials. In a number of embodiments, robust metallic glass-based strain wave gears having flexsplines characterized by a major diameter of less than approximately 2 inches are implemented using MG-based materials. Conventionally, the manufacture of strain wave gears from steel at such small dimensions can be challenging. In particular, in order for steel to be made to achieve the requisite level of flexibility for suitable flexspline operation at such small dimensions, it generally has to be made in the form of a relatively thin walled structure. However, because the flexspline has to be made to conform to this thin shape, it can be undesirably fragile. By contrast, metallic glass-based materials can be relatively much thicker and still possess the requisite level of flexibility. This is because metallic glass-based materials can be made to be much less stiff than steel-based materials. Accordingly, the thicker flexsplines made from metallic glass-based materials can be much more durable. Moreover, it can be much easier to cast thicker metallic glass-based as opposed to thinner metallic glass-based materials.

Figure 21:
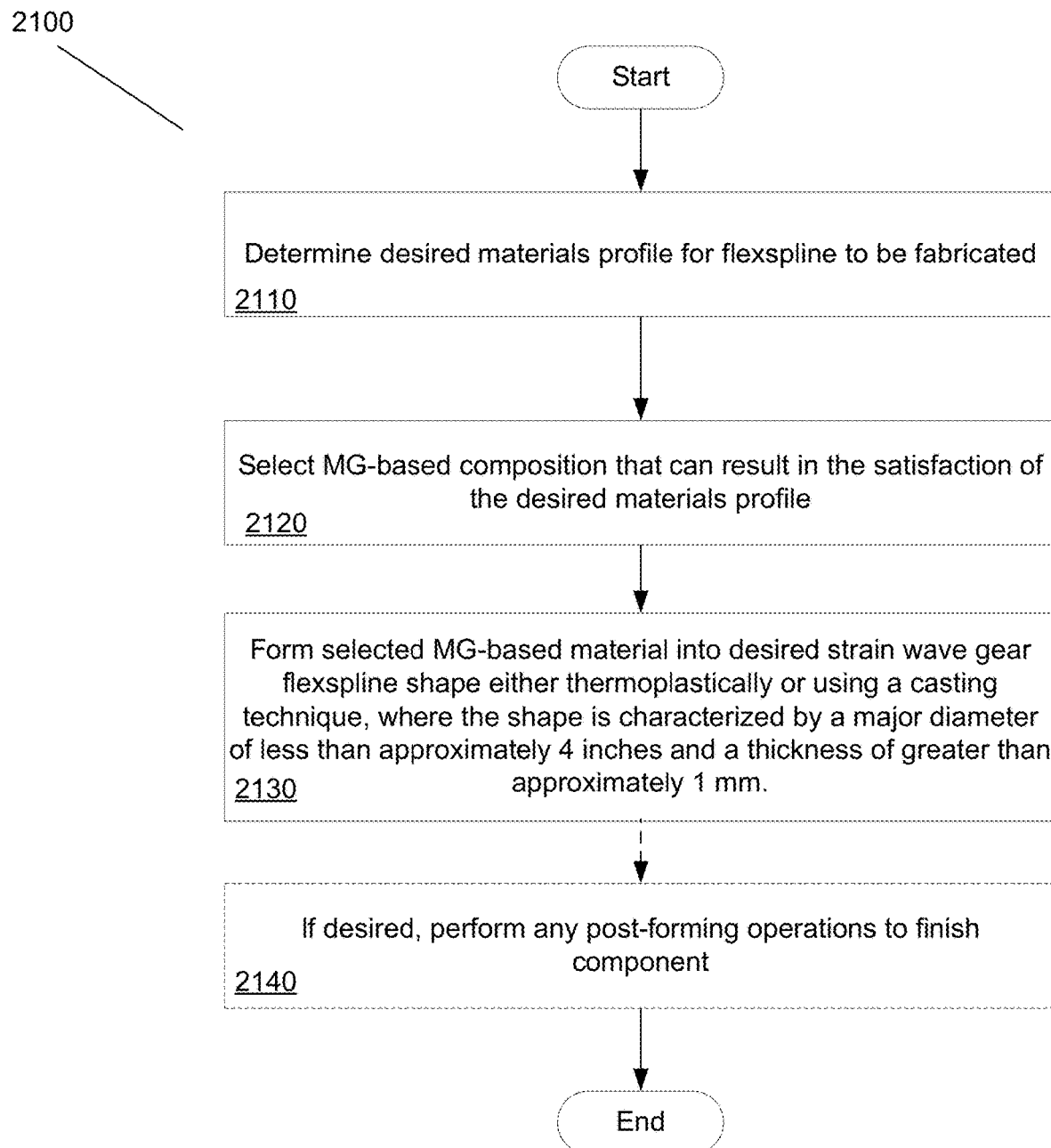
FIG. 21 illustrates forming a relatively smaller strain wave gear flexspline in accordance with certain embodiments of the invention.

FIG. 21 illustrates a process for fabricating a strain wave gear flexspline characterized by a maximum diameter of less than approximately 4 inches in accordance with certain embodiments of the invention. In particular, the process 2100 is similar to that described with respect to FIG. 6 insofar as it includes determining 2110 a desired materials profile and selecting 2120 a suitable MG-based composition from which the desired materials profile can be realized. Within the context of the instant application, the term "MG-based composition" can be understood to reference an element or aggregation of elements that are capable of forming a metallic glass-based material (e.g. via being exposed to a sufficient cooling rate). As before, the selection 2120 can account for any of a variety of alloy variations—in other words, a base composition can be alloyed as desired in order to converge on a suitable MG-based composition that can yield the desired result. The materials selection 2120 can also account for the application of any of a variety of processing methodologies on a given composition. For instance, a base composition can be heat treated during the forming process so as to develop desired crystalline phases within the context of a metallic glass composite. The method 2100 further includes forming 2130 the selected MG-based composition into the desired strain wave gear flexspline shape characterized by the desired materials properties, a thickness of greater than approximately 1 mm and a major diameter of less than approximately 4 inches. Of course, any suitable forming process can be implemented in accordance with embodiments of the invention that can allow for the realization of the MG-based material, including casting processes and thermoplastic forming processes. For instance, casting processes can be implemented that allow for sufficiently rapid cooling rates (e.g. 1000 K/s) so as to cause the formation of an amorphous matrix can be implemented. In many embodiments, the forming 2130 of the flexspline includes casting the selected MG-based material around a crystalline metal solid body. This technique is disclosed in U.S. patent application Ser. No. 14/971,848 ("the '848 app"), incorporated by reference above. This can be an effective casting strategy as the formed MG-based material can be easily removed from the crystalline metal solid body since the crystalline metal solid body will typically shrink upon the cooling of the cast material to a greater extent than the cast MG-based material (as disclosed in the '848 app). In several embodiments, thermoplastic forming techniques are implemented to form the composition into the desired shape. For example, any of the above-described thermoplastic forming techniques can be implemented. In a number of instances, localized thermoplastic forming processes are implemented. Localized thermoplastic forming processes are disclosed in U.S. patent application Ser. No. 14/252,585, and generally involve locally heating a metallic glass-based material within a first region to a temperature greater than the glass transition temperature of the metallic glass-based material, and deforming the metallic glass-based material within the first region while the temperature of the metallic glass-based material within the first region is greater than its respective glass transition temperature. As can be appreciated, this can be achieved in any of a variety of ways. The disclosure of U.S. patent application Ser. No. 14/252,585 is hereby incorporated by reference in its entirety, especially as it pertains to localized thermoplastic forming processes. More generally, any of a variety of forming processes can be implemented in accordance with embodiments of the invention.

Subsequent to forming processes, as before, any post-forming operations can be performed 2140. In many instances, the formed 2130 flexsplines are "net shape" and do not require any appreciable post-forming processing. In a number of embodiments, the formed 2130 flexsplines are 'near net shape' and require minimal post-forming processing to finish the part. For instance, surface finishes can be implemented. Any suitable post-forming processing can be implemented in accordance with embodiments of the invention, including any of the processes mentioned previously with respect to FIG. 6.

Figure 22A:
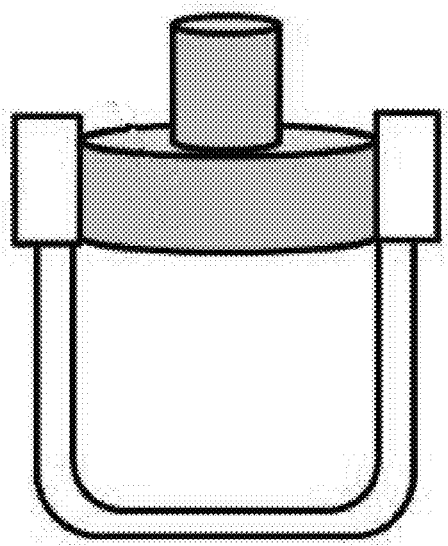
FIGS. 22A-22C illustrate flexsplines having relatively thicker walls in accordance with certain embodiments of the invention.
Figure 22B:
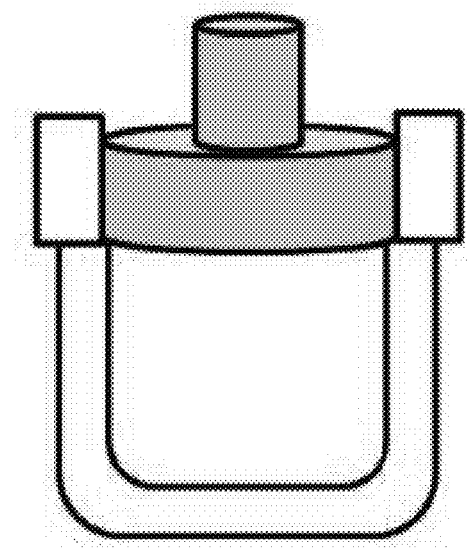
Figure 22C:
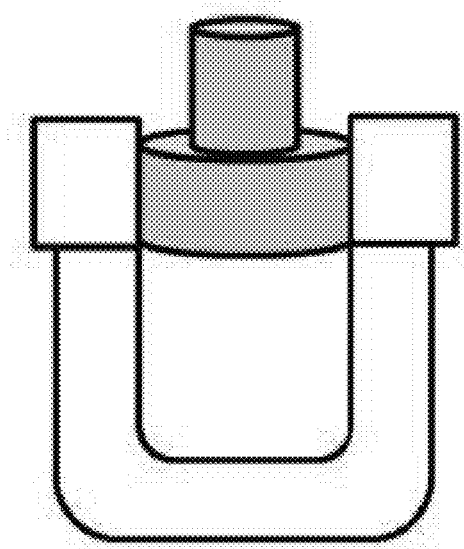

FIGS. 22A-22C illustrate strain wave gear flexsplines having various thicknesses for purposes of comparison. In particular, FIG. 22A illustrates the wave generator and a flexspline of a conventional steel-based strain wave gear flexspline, characteristically possessing a relatively thin wall. FIG. 22B illustrates the wave generator and the flexspline of a strain wave gear manufactured from metallic glass-based components. In particular, it is depicted that the cup-shaped flexspline has a thicker wall than that of the steel-based flexspline seen in FIG. 22A; however, the "toothed" portion of the flexspline is similar in geometry to that seen in FIG. 22A. Correspondingly, the wave generator also maintains a similar geometry. In this way, the flexspline can be relatively more robust compared to the geometry illustrated in FIG. 22A, but can still accommodate a pre-defined wave generator geometry. FIG. 22C illustrates that both the cup-portion of the flexspline and the toothed portion of the flexspline are made to be thicker from a MG-based material. In this instance, the wave generator would have to have a different geometry to accommodate the thicker toothed portion. The MG-based material can be sufficiently flexible that suitable strain wave gear operation can be maintained even with the thicker geometry. Whereas smaller strain wave gears constructed from steel had to utilize thin-walled structures (generally less than 1 mm) in order to realize the requisite flexibility, smaller strain wave gears constructed from MG-based materials can be much thicker. In this way, strain wave gears that are more structurally resilient can be produced using MG-based materials. Additionally, it can be much easier to cast metallic glass-based materials of greater thickness relative to casting thin walled MG-based structures.

Figure 23:
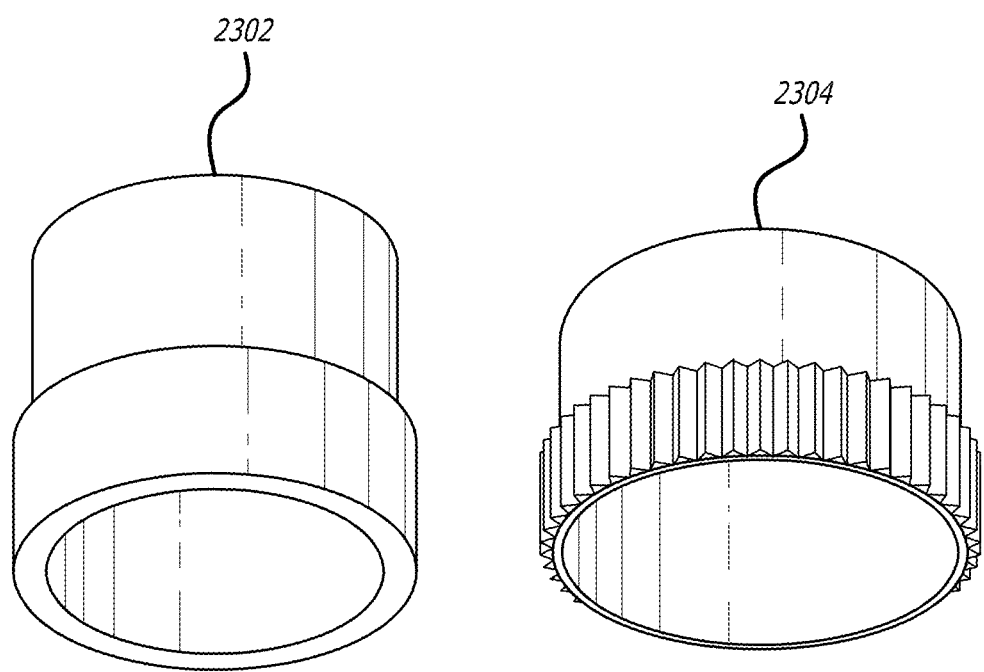
FIG. 23 illustrates a conventional steel-based flexspline relative to a thicker MG-based flexspline in accordance with an embodiment of the invention.

As an example, FIG. 23 depicts an isometric view of a thick-walled MG-based flexspline 2302 relative to an equivalent thin-walled steel-based flexspline 2304.

While FIG. 21 illustrates a generalized process for fabricating a flexspline, it should be clear that the depicted process can be applied and/or augmented in any of a variety of ways in accordance with many embodiments of the invention. For example, in many embodiments, the method further includes computing a maximum thickness that the flexspline can be made to possess and still viably operate under the desired operating conditions based on the inherent structural characteristics of the MG-based material to be implemented, and forming the flexspline into the desired shape wherein the formed flexspline is characterized by a thickness of less than the computed thickness. In many instances the computed wall thickness accounts for the resistance to fatigue failure. In many embodiments, the method is further characterized insofar as the maximum thickness of the formed flexspline is approximately 3 mm.

Figure 24A:
FIGS. 24A-24B illustrate S-shaped gear teeth that can be implemented in accordance with certain embodiments of the invention.
Figure 24B:
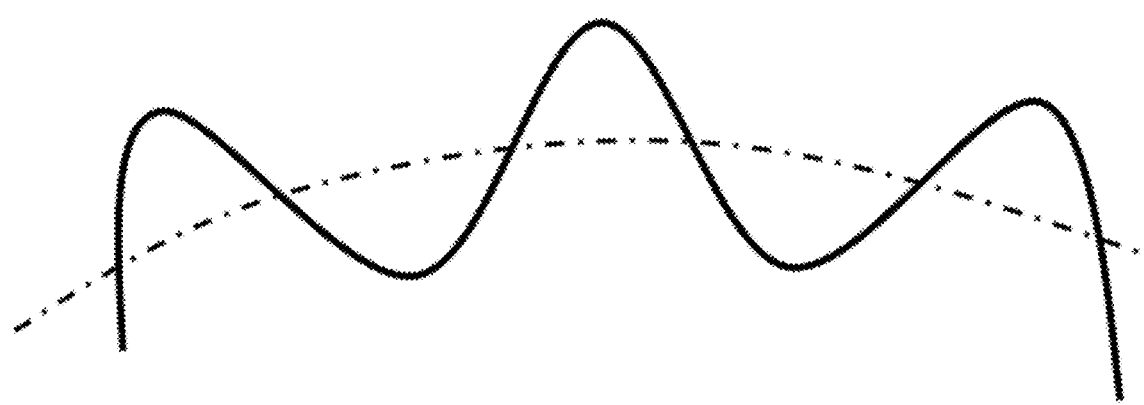

Notably, the ability to rely on casting and thermoplastic manufacturing techniques can greatly enhance the customizability of the manufacture of strain wave gears. For example, strain wave gearing components can be more readily cast in non-traditional shapes. Thus for example, in many embodiments of the invention, flexsplines and/or circular splines are cast so that they include "S-shaped" teeth. Conventional gear teeth geometries can result in excessive and unwanted contact known as backlash between intermeshing teeth. By contrast, gear teeth characterized by S-shaped geometries can allow for minimized backlash and therefore smoother operation. FIGS. 24A and 24B illustrate conventional gear teeth geometries relative to S-shaped gear teeth geometry. In particular, FIG. 24A illustrates conventional gear teeth geometry, and highlights the area where backlash can be impactful. FIG. 24B illustrates S-shaped gear teeth geometry that can be implemented via casting and/or other thermoplastic forming techniques in accordance with many embodiments of the invention. Of course, while the implantation of S-shaped teeth is discussed and illustrated, any suitable component shapes can be implemented in accordance with embodiments of the invention. Casting and thermoplastic processes are versatile and lend themselves the production of any of a variety of geometries.

While the above-discussion has regarded the implementation of MG-based materials by utilizing them as the bulk material within respective strain wave gear components, in many embodiments, MG-based materials are coated onto strain wave gears fabricated from more conventional materials (e.g. steel and/or plastics). In this way, the wear-resistant properties of any of a variety of MG-based materials can be harnessed.

As can be seen, the described manufacturing methods can enable the implementation of highly customized strain wave gears. They can be made to possess any of a variety of intrinsic materials properties based on the implemented metallic glass-based materials. And they can also readily be made to conform to unconventional, but advantageous, geometries. This level of customization is generally not feasible with conventional steel manufacturing methodologies.

As can be inferred from the above discussion, the above-mentioned concepts can be implemented in a variety of arrangements in accordance with embodiments of the invention. For example, in some embodiments, strain wave gear components are cast from polymeric materials, and subsequently coated with bulk metallic glass-based materials. In this way, the wear resistant properties of bulk metallic glass-based materials can be harnessed. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What claimed is:

1. A method of fabricating a flexspline of a strain wave gear comprising:
    providing a mold having a shape of a flexspline;
    forming a MG-based composition into the flexspline using a forming technique comprising:
        heating an MG-based composition to a temperature greater than the glass transition temperature of the MG-based composition,
        depositing the MG-based composition into the mold,
        conforming the MG-based composition to the shape of the mold while the temperature of the MG-based composition within the first region is greater than its respective glass transition temperature of the MG-based composition,
        quenching the MG-based composition sufficiently rapidly to maintain at least some amorphous structure in the MG-composition,
        removing the MG-based composition from the mold, and
        wherein the forming of the MG-based composition results in a formed flexspline comprising a MG-based material; and
    wherein the formed flexspline is characterized by: at least a portion having a thickness of greater than approximately 1 mm and a major diameter of less than approximately 4 inches.

2. The method of claim 1, wherein the mold is an outer mold defining the final shape of the flexspline, and wherein the MG-based composition is poured into and forcibly pressed against the mold.

3. The method of claim 1, wherein the formed MG-based material has an entirely amorphous structure.

4. The method of claim 1, wherein the formed MG-based material is a metallic glass matrix composite.

5. The method of claim 1, wherein the formed MG-based material is further characterized by the inclusion of at least one set of gear teeth.

6. The method of claim 5, wherein the gear teeth have a non-linear tooth profile.

7. The method of claim 1, wherein the MG-based composition is a MG-based composition comprising at least one material selected from the group of Cu, Ti and Zr.

8. The method of claim 1, wherein the selected MG-based composition is a composite material that includes at least one of one of V, Nb, Ta, Mo, and Sn.

9. The method of claim 1, wherein the formation of the flexspline is a net shape process.

10. The method of claim 9, wherein the flexspline comprises plurality of gear teeth formed to a near-net shape, and further comprising finishing the plurality of gear teeth to form the plurality of gear teeth into a net shape.

11. The method of claim 1, wherein the formed flexspline has a wall characterized by a maximum thickness of less than approximately 3 mm.

12. The method of claim 1, wherein the heating technique is one of: a capacitive discharge forming technique and a frictional heating technique.

13. The method of claim 1, wherein the conforming technique is one of: spin forming, blow molding, and centrifugal casting.

14. The method of claim 1, wherein the MG-composition is powderized and then fused during the heating.

15. The method of claim 1, further comprising finishing the MG-material.

16. The method of claim 1, wherein the flexspline comprises at least one groove configured to contain at least one spherical body.

17. The method of claim 1, wherein the MG-composition is initially provided as a feedstock formed as one or more sheets, wherein the sheet is at least partially amorphous and has sufficient volume to form the flexspline after forming.

18. The method of claim 17, wherein more than one sheet is used to form the flexspline, and wherein the MG-composition forming each sheet has insufficient glass forming ability to form a single sheet of sufficient thickness to form the flexspline.

19. The method of claim 18, wherein the more than one sheet collectively has sufficient thickness to form the flexspline.

20. The method of claim 18, wherein the flexspline is formed of a plurality of materials at least one of which is the MG-composition and at least one of which is a MG composite material.

* * * * *